(12) United States Patent
Erten et al.

(10) Patent No.: US 6,236,862 B1
(45) Date of Patent: May 22, 2001

(54) CONTINUOUSLY ADAPTIVE DYNAMIC SIGNAL SEPARATION AND RECOVERY SYSTEM

(75) Inventors: Gamze Erten; Faihi M. Salam, both of Okemos, MI (US)

(73) Assignee: Intersignal LLC, Okemos, MI (US)

( * ) Notice: Subject to any disclaimer, the term of this patent is extended or adjusted under 35 U.S.C. 154(b) by 0 days.

(21) Appl. No.: 08/990,682

(22) Filed: Dec. 15, 1997

Related U.S. Application Data
(60) Provisional application No. 60/033,083, filed on Dec. 16, 1996.

(51) Int. Cl.[7] .............................. H04B 7/01; H04Q 7/28
(52) U.S. Cl. ..................... 455/501; 455/561; 455/506; 370/342
(58) Field of Search ................................. 455/101, 102, 455/103, 105, 227, 228, 229, 280, 561, 501, 506; 370/320, 335, 342

(56) References Cited

U.S. PATENT DOCUMENTS

| | | |
|---|---|---|
| 5,150,323 | 9/1992 | Castelaz . |
| 5,383,164 * | 1/1995 | Sejnowski et al. .................... 67/134 |
| 5,420,787 | 5/1995 | Gawne et al. . |
| 5,539,730 * | 7/1996 | Dent ...................................... 370/29 |
| 5,566,168 * | 10/1996 | Dent ...................................... 370/50 |
| 5,907,545 * | 5/1999 | Arai et al. ............................ 370/342 |
| 5,943,331 * | 8/1999 | Lavean ................................. 370/335 |
| 6,009,089 * | 12/1999 | Huang et al. ........................ 370/342 |

OTHER PUBLICATIONS

C. Jutten and J. Herault, "Blind Separation of Sources, Part I: An adaptive algorithm based on neuromimetic architecture", Signal Processing, vol. 24, No. 1, Jul. 1991, pp. 1–10.

C. Jutten and J. Herault, "Blind Separation of Sources, Part II: Problems Statement", Signal Processing, vol. 24, No. 1, Jul. 1991, pp. 11–20.

E. Sorouchyari, "Blind Separation of Sources, Part III: Stability Analysis", Signal Processing, vol. 24, No. 1, Jul. 1991, pp. 21–29.

J.C. Platt and F. Faggin, "Networks For the Separation of Sources that are Superimposed and Delayed, Advances in Neural Information Processing Systems 4", Proc. of the NIPS conference, 1991, Morgan–Kaufmann.

F.M. Salam, An Adaptive Network for Blind Separation of Independent Signals, Proceedings of the 1993 IEEE International Symposium on Circuits and Systems (ISCAS) vol. 1, pp. 431–434.

E. Vittoz and X. Arreguit, "CMOS Integration of Herault–Jutten Cells for separation of sources", Analog VLSI Implementation of Neural Systems, Edited by C. Mead and M. Ismail, Kluwer Academic Publishers, 1989.

(List continued on next page.)

Primary Examiner—William G. Trost
Assistant Examiner—Sheila Smith
(74) Attorney, Agent, or Firm—Young & Basile, P.C.

(57) ABSTRACT

A method and apparatus for dynamically separating and recovering original signal sources by processing a set of mixed received mixtures and convolution of said signals utilizing differential equations and a computer. The system of the invention enables the blind separation and recovery of an unknown number of signals mixed together in dynamically changing interference environments with very minimal assumption on the original signals. The system of this invention has practical applications to nonmultiplexed media sharing, adaptive interferer rejection, acoustic sensors, acoustic diagnostics, medical diagnostics and instrumentation, speech, voice, language recognition and processing, wired and wireless modulated communication signal receivers, and cellular communications.

22 Claims, 16 Drawing Sheets

OTHER PUBLICATIONS

M.H. Cohen, P.O. Pouliquen and A.G. Andreou, "Analog LSI Implementation of Auto–Adaptive Network for Real Time Separation of Independent Signals", Advances in Neural Information Processing Systems, vol. 4, Morgan Kaufmann, San Mateo, California, 1992.

A.B. Gharbi and F.M. Salam, "Test results of a chip for the separation of mixed and filtered signals", IEEE Transactions of Circuits and Systems—II Analog and Digital Signal Processing, vol. 42, No. 11, Nov. 1995, pp. 748–751.

A.B. Gharbi and F.M. Salam, "Implementation and Experimental Results of a Chip for the Separation of Mixed and Filtered Signals", Journal of Circuits Systems and Computers, vol. 6, No. 2, pp. 115–138, World Scientific Publishing Company, 1996.

* cited by examiner

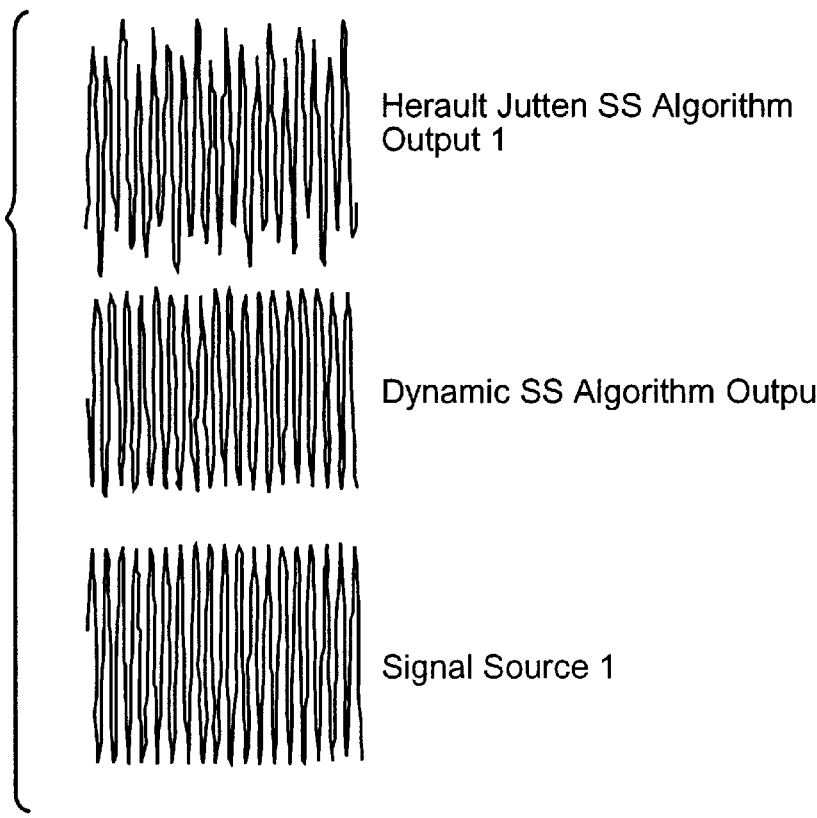
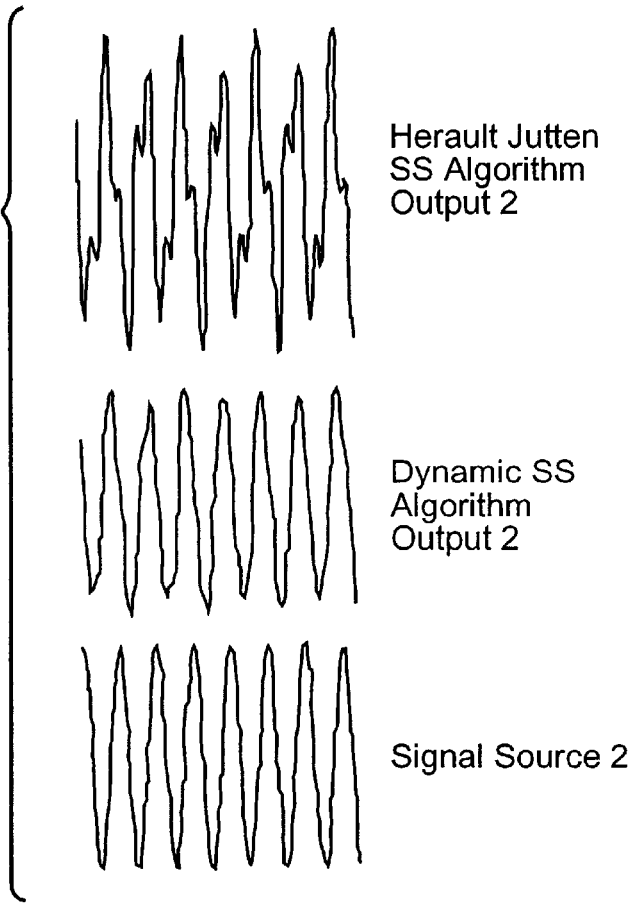

FIG - 8 HJ Algorithm delay = 0.00002 (series 1 - 2 kHz signal)
0.00003 (series 2 - 5 kHz signal)
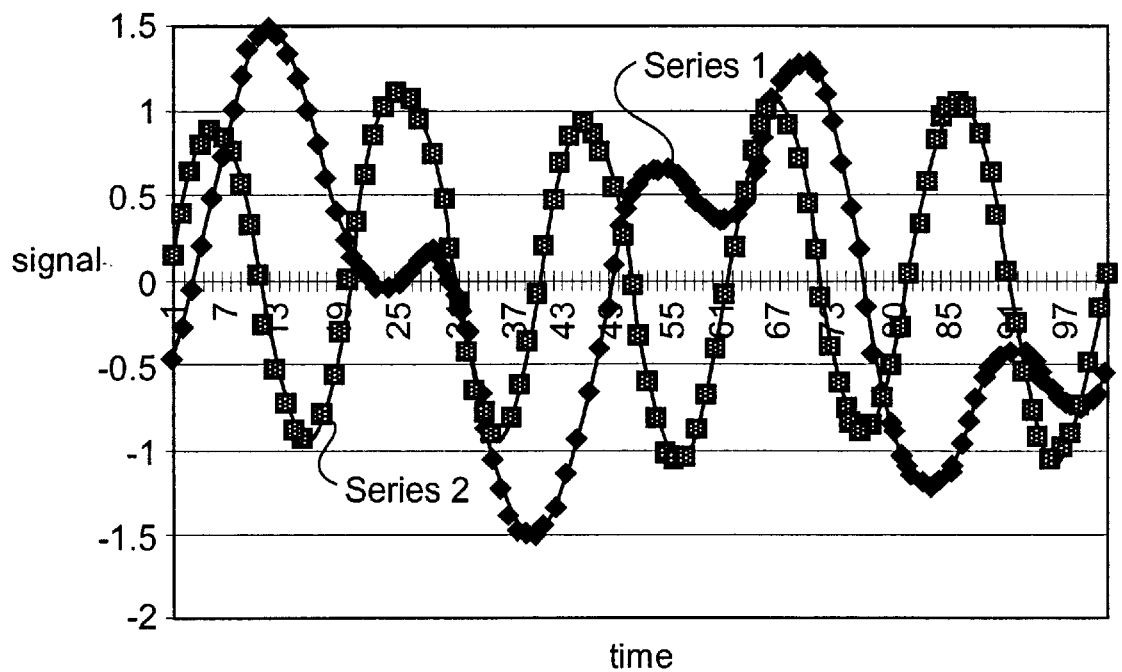
FIG - 9 DYN Algorithm delay = 0.00002 (series 1 - 2 kHz signal)
0.00003 (series 2 - 5 kHz signal)
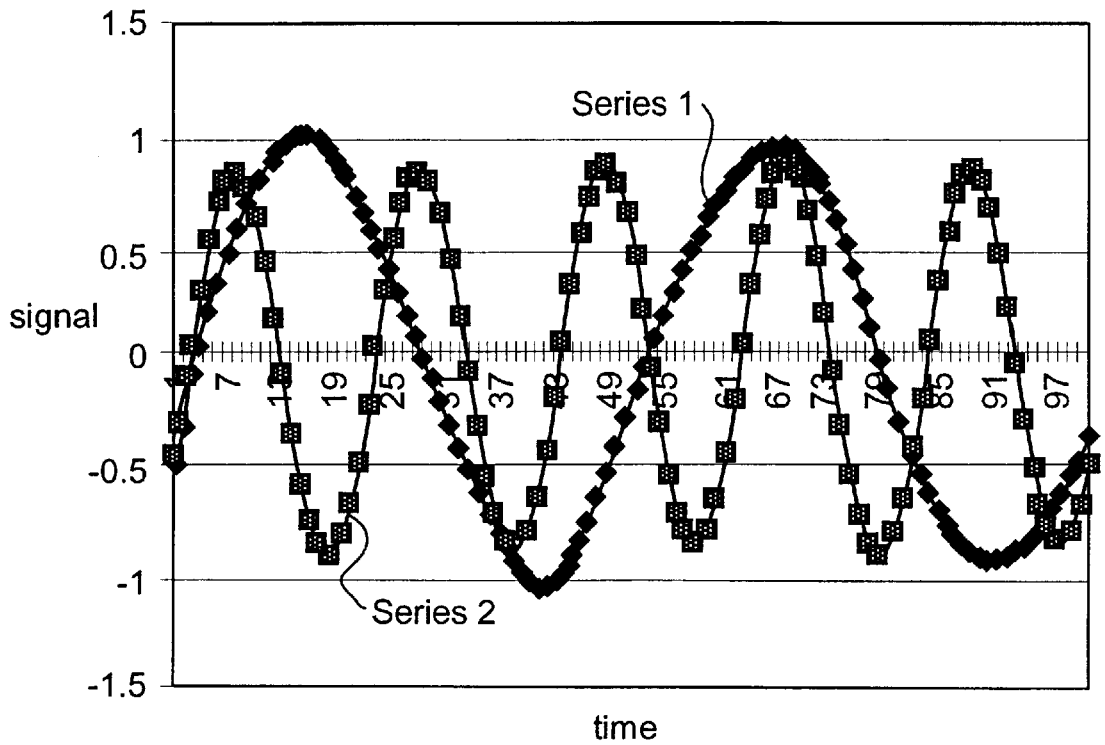

(a) The multiplication unit (b) the summation unit (c) the functional blocks

MAC : multiplier accumulator
ALU : arithmetic logic unit

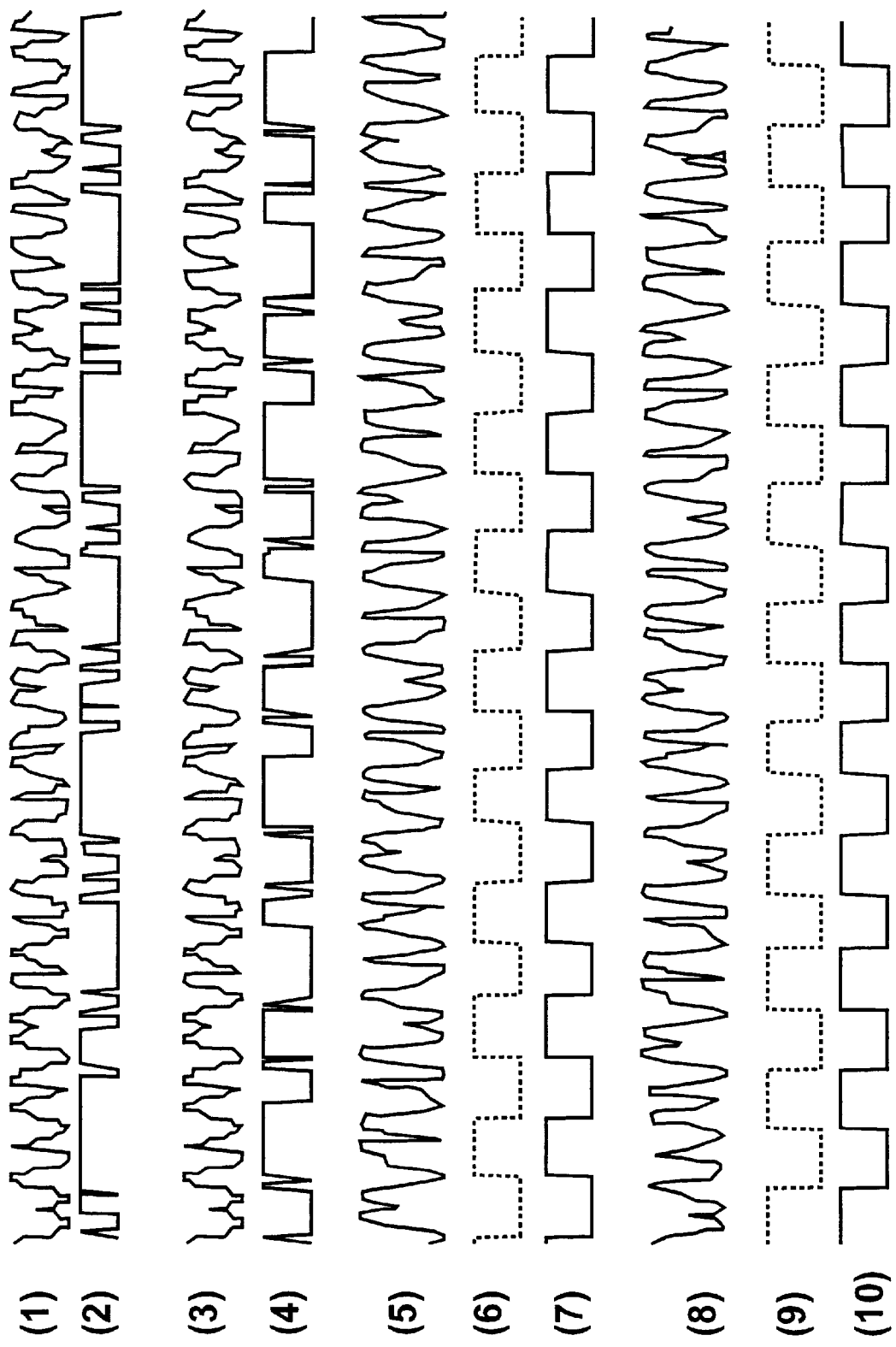

CONTINUOUSLY ADAPTIVE DYNAMIC SIGNAL SEPARATION AND RECOVERY SYSTEM

CROSS REFERENCE TO CO-PENDING APPLICATION.

This application claims the benefit of U.S. provisional application Ser. No. 60/033,083 filed Dec. 16, 1996.

BACKGROUND OF THE INVENTION.

1. Field of the Invention

The invention pertains to systems for recovering original signal information or content by processing multiple measurements of a set of mixed signals, and more specifically, the invention pertains to adaptive systems for recovering original signals from among several received measurements of their mixtures.

2. Description of the Related Art

The recovery and separation of independent sources is a classic but difficult problem in signal processing. The problem is complicated by the fact that in many practical situations, many relevant characteristics of both the signal sources and the mixing media are unknown.

Two main categories of methods exist in prior art:

1. Conventional discrete signal processing (Please see U.S. Pat. Nos. 5,208,786 and 5,539,832), and 2. Neurally inspired adaptive algorithms (Please see U.S. Pat. Nos. 5,383,164 and 5,315,532).

Conventional signal processing approaches to signal separation originate in the discrete domain in the spirit of traditional digital signal processing methods that use statistical properties of signals. Such signal separation methods employ discrete signal transforms and filter/transform function inversion. Statistical properties of the signals in the form of a set of cumulants are used and these cumulants are mathematically forced to approach zero. This constitutes the crux of the family of algorithms that search for the parameters of transfer functions that recover and separate the signals from one another. Calculating all possible cumulants, on the other hand, would be impractical and too time consuming for real time implementation. Neurally inspired adaptive algorithms follow an algebraic method originally proposed by J. Herault and C. Jutten, now called the Herault-Jutten (or HJ) algorithm. The suitability of this set of methods for CMOS integration have been recognized. However, the HJ algorithm is at best heuristic with suggested adaptation laws that have been shown to work mainly in special circumstances. The theory and analysis of prior work pertaining to the HJ algorithm are still not sufficient to support or guarantee the success encountered in experimental simulations. Both Herault and Jutten recognize these analytical deficiencies and they describe additional problems to be solved. Their proposed algebraic algorithm assumes a linear static filtering with no delays. Specifically, the original signals are assumed to be transferred by the medium via a matrix of unknown but constant coefficients. To summarize, the Herault-Jutten method (i) is restricted to the full rank and linear static mixing environments, (ii) requires matrix inversion operations, and (iii) does not take into account the presence of signal delays. In many practical applications, however, delays do occur and and in many occasions the medium mixing exhibits nonlinear phenomena. Accordingly, previous work fails to successfully separate signals in many practical situations and real world applications.

OBJECTS OF THE INVENTION

It is an object of the invention to recover and separate mixed signals transmitted through a common medium or channel wherein the separation of signals is of such high quality as to substantially increase (i) the signal carrying capacity of the medium or channel, (ii) the quality of the received signal, or (iii) both. The media or channels may consist of a combination of wires, cables, fiber optics, wireless radio or light based frequencies or bands, as well as a combination of solid, liquid, gas particles, or vacuum.

Another object of the invention is to separate mixed signals through a common media or channel wherein a high quality of signal separation is achieved by hardware presently produceable by state of the art techniques.

SUMMARY OF THE INVENTION

Separation of statically mixed signals is of limited use because of additional factors involved in the superposition of signals in real mixing environments. Some examples of additional factors to be considered include (1) the propagation time delays between sources and receivers or sensors, (2) the nonlinear nature of the mixing functions introduced by the mixing medium as well as the signal sensors or receivers, and (3) unknown number of source signals that are to be separated. The system of this invention adds a generalized framework to the described preexisting approaches for coping with a range of dynamic superposition circumstances unaddressed to date. The most practically pertinent of these failures is failure to model the medium of signal mixing, noise generation and interference adequately, in particular assumption of a linear static medium and no delays. The invented method addresses this shortfall by extending the formulation of the problem to include a dynamic modeling of the signal mixing/interference medium.

To best understand the problem solved by the invention, and the approach of the prior art to solve this problem, the following problem statement is helpful:

With reference to FIG. 1 of the attached drawings, consider several independent signals as $s_1(t), \ldots,$ and $S_N(t)$. These signals may represent any of, or a combination of, independent speakers or speeches, sounds, music, radio-based or light-based wireless transmissions, electronic or optic communication signals, still images, videos, etc. These signals may be delayed and superimposed with one another. We assume a linear time-invariant medium or environment. One desires a "network" that, upon receiving the delayed and superimposed signals, works to successfully separate the independent signals.

The problem is illustrated in FIG. 1, from prior art. In addition, two distinct practical situations that summarize the problem are shown pictorially in FIG. 2 and FIG. 3. In FIG. 2, two signals are illustrated that originate from two different sources and are received by one receiver tuned to both sources. These two mixtures are used to recover both original signals. In FIG. 3, two signals are illustrated that originate from two different sources and are received by two sensors separated by a distance D. The sources are mixed in the propagation medium and their wave fronts hit the sensors at different angles and at different phases. As the distance between the two receivers decreases, this situation approaches a static problem since the source signals arrive with less delay with respect to one another. The situations described in FIGS. 2 and 3 can be schematically equated to a symbolic diagram shown in FIG. 4 wherein the schematic illustration represents two signals originating from two different sources that are mixed dynamically. The sources are mixed in the propagation medium and the mixing involves relative delays in addition to gains determined by the entries ij of the mixing matrix.

A simple practical mixing problem of two signals and their delayed versions could be formulated as $$\begin{bmatrix} E_1(t) \\ E_2(t) \end{bmatrix} = \begin{bmatrix} a_{11} & 0 \\ 0 & a_{22} \end{bmatrix} \begin{bmatrix} s_1(t) \\ s_2(t) \end{bmatrix} + \begin{bmatrix} 0 & a_{12} \\ a_{21} & 0 \end{bmatrix} \begin{bmatrix} s_1(t-\delta_1) \\ s_2(t-\delta_2) \end{bmatrix}$$

where $\delta_1$ and 62 are the time delays for $s_1$ and $s_2$, respectively. If $\delta_1=\delta_2=0$, this would reduce to linear static signal mixing as the situation described in the Herault-Jutten problem.

First, let us note that the problem involving delays (i.e., $\delta_2 \neq 0$ or $\delta_1 \neq 0$ as in FIG. 2) is significantly more difficult to solve.

FIG. 5 shows two sine wave signals of different frequencies which are dynamically mixed as discussed below. In the example discussed here, source 1, $s_1(t)$, is a sine wave of frequency 2 kHz, source 2, $s_2(t)$, is a sine wave of 5 kHz. Each signal is delayed 100 microseconds (i.e., $\delta_1=\delta_2=0.0001$ sec). The mixing coefficients are $a_{11}=a_{22}=1$ and $a_{12}=a_{21}=0.7$.

The Herault-Jutten approach to signal separation assumes that the "statistically independent" signal vector $S(t)=[s_1(t), \ldots, \text{ and } s_N(t)]^T$ is statically mixed via a constant matrix to produce the signal vector E(t). The vector E(t) is received by the sensors (e.g. microphones, antenna, etc.). Let S(t) be of an N dimensional and E(t) be of dimension N. Specifically, $$E(t)=D^* S(t) \quad \text{Equation (1)}$$

where $D^*$ is an N×N matrix. The proposed network has the form $$Y(t)=-D\ Y(t)+E(t) \quad \text{Equation (2)}$$

where the N×N matrix D has its diagonal elements zero and the off-diagonal elements $d_{ij}$ are updated according to the update laws:

$$d_{ij}=\eta_{ij}\ f\ (y_i\ (t))\ g\ (y_j\ (t)) \quad \text{Equation (3)}$$

where $\eta_{ij}$ is sufficiently small, f () and g () are a pair of different odd functions, for example a hyperbolic tangent function and a cubic function. In the implementation of these equations, specially in simulations, one solves for Y(t) from equation (2) as $$Y(t)=[I+D]^{-1}\ E(t) \quad \text{Equation (4)}$$

(Assuming that the inverse exists which places a restriction on this formulation's practical implementations.)

Then one uses Equation (4) in the update of Equation (3). This procedure is cumbersome and requires excessive computation of the inverse and it also makes the realization of the Herault-Jutten approach into hardware computing platforms difficult and inconvenient.

In the practice of the invention, signal separation is significantly improved over prior signal separation techniques, including static linear algebraic equation based and conventional discrete signal processing systems in that the invention dynamically processes and separates the mixed signals by the use of dynamic algorithms formulated as a set of differential equations. The differential equations can be solved by a variety of suitable computing appliances, with varying hardware and software components endowed with the practice of the invention. The input to such a computing appliance is an appropriate set of mixtures received through a plurality of detectors, with each detector receiving signals from a plurality of sources. The output from the computing device, after the processing of input with the practice of the invention, is a set of separated signals, including restored source signals which approximate the original signals without interference.

BRIEF DESCRIPTION OF THE DRAWINGS

The aforementioned objects and advantages of the invention will be appreciated from the following description and accompanying drawings wherein:

FIG. 8 illustrates two output signals from the Herault-Jutten algorithm resulting from the processing of two mixed signals originating from two different sources, FIG. 9 illustrates two output signals similar to FIG. 8 but processed in accord with the process of the invention, FIG. 24 is a sample illustration of the algorithm using the BPSK modulated mixtures of FIG. 23 on the same frequency, ten channels being shown numbered consecutively from top to bottom.

DESCRIPTION OF THE PREFERRED EMBODIMENT

Figure 1:
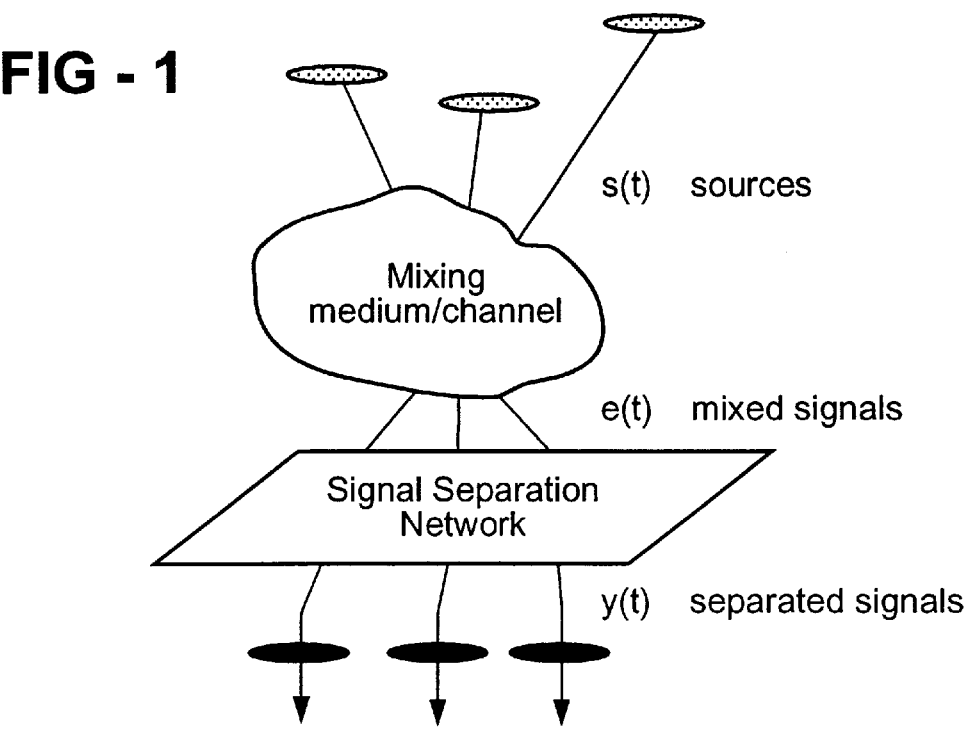
FIG. 1 is a schematic illustration of the problem statement.
Figure 2:
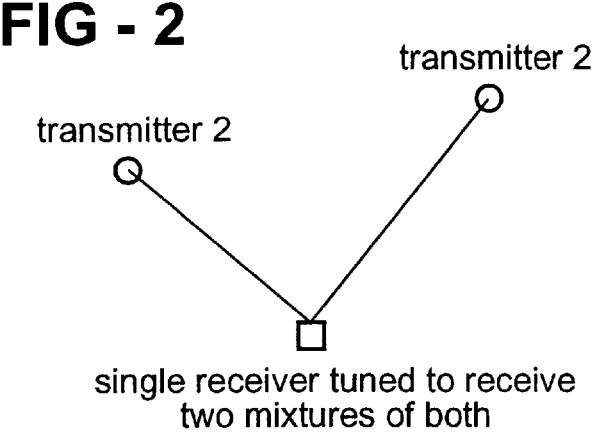
FIG. 2 is a schematic illustration of two signals originating from two different sources received by a single receiver tuned to sources representing a system wherein source signals arrive to a receiver with no delay with respect to one another.
Figure 3:
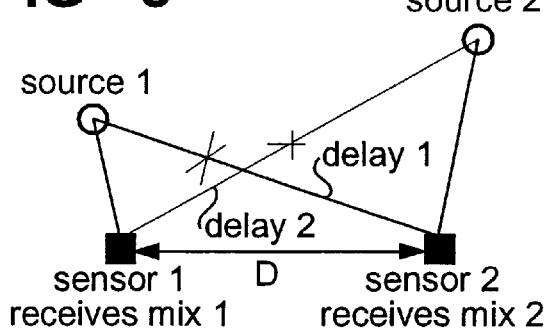
FIG. 3 is a schematic illustration indicating two signals that originate from two different sources as received by two sensors separated by a distance D, the sources being mixed in the propagation medium and their wave fronts strike the sensors at different angles and at different phases.

In the practice of the invention, the algorithm in accord with the invention starts in the differential equation domain, which can be realized and processed with discrete or continuous methods, and the discretization process of the algorithm can take many forms which one can choose depending on the implementation platform. The algorithm of the invention and framework consider general time domain systems making the invention practical with respect to prior similar work in that the practice of the invention accommodates signal delays which are routinely experienced in signal transmission. In the practice of the invention, the approach to the problem of signal separation employed exploits the crossproducts of two different nonlinear odd functions f () and g (). By the use of differential equations, a variety of numerical solution methods are available, and both continuous (as in analog electronics) and discrete time (as in digital computing) can be used as appropriate. The practice of the invention requires no matrix inversion as required by the Herault-Jutten system for signal separation; in the practice of the invention, signal separation is dynamic and the framework of the invention can be extended to an environment description which includes nonlinearities. In the invention, the signal separation problem is solved by numerically solving a set of differential equations by computer without the need for a matrix inversion operation.

The equation Y(t)=−D Y(t)+E(t) can best be represented as an averaged equilibrium equation of the dynamic system of the invention:

$$\dot{Y}(t) = -Y(t) - D^* Y(t) + E(t) \qquad \text{Equation (5)}$$

This facilitates the computation by initializing the differential equation in Equation (5) from an arbitrary guess. It is important however to ensure the separation of time between Equation (5), namely $$\dot{Y}Y(t) = -Y(t) - D^* Y(t) + E(t)$$

and an adaptation procedure similar to that in Equation (3), namely $$d^*{}_{ij} = \eta_{ij} f_i(y_i(t)) g_g(y_j(t)) \qquad \text{Equation (6)}$$

This may be ensured by making $\eta_{ij}$ in the equation above relatively and sufficiently small in comparison with the time constant of Equation (5) above. Also, note that different f() as well as different g() functions can be used, which are enumerated in the modified version of Equation (3) above as $f_i()$ and $g_j()$.

Assuming the dimensionality of E is M, a set of differential equations that define the dynamic signal separation algorithm can be written as $$\tau_1 \dot{y}_i(t) = e_i(t) - y_i(t) - \sum_{j \neq i} d^*_{ij} y_j(t) \qquad \text{Equation (7)}$$

for $i = 1, \ldots, M$

This enumerates M differential equations with M (N−1) terms in the summation portion of each equation. In addition, the adaptation process for the entries of the matrix D* (i.e., $d_{ij}$) requires the evaluation of functions $f_i()$ and $g_j()$ as shown in Equation (6) M (N−1) times.

The system of this invention offers several procedural alternatives depending upon whether or not a known number of signals are mixed or superimposed by the medium or channel, and the number of nonidentical composite signal mixtures available.

Figure 18:
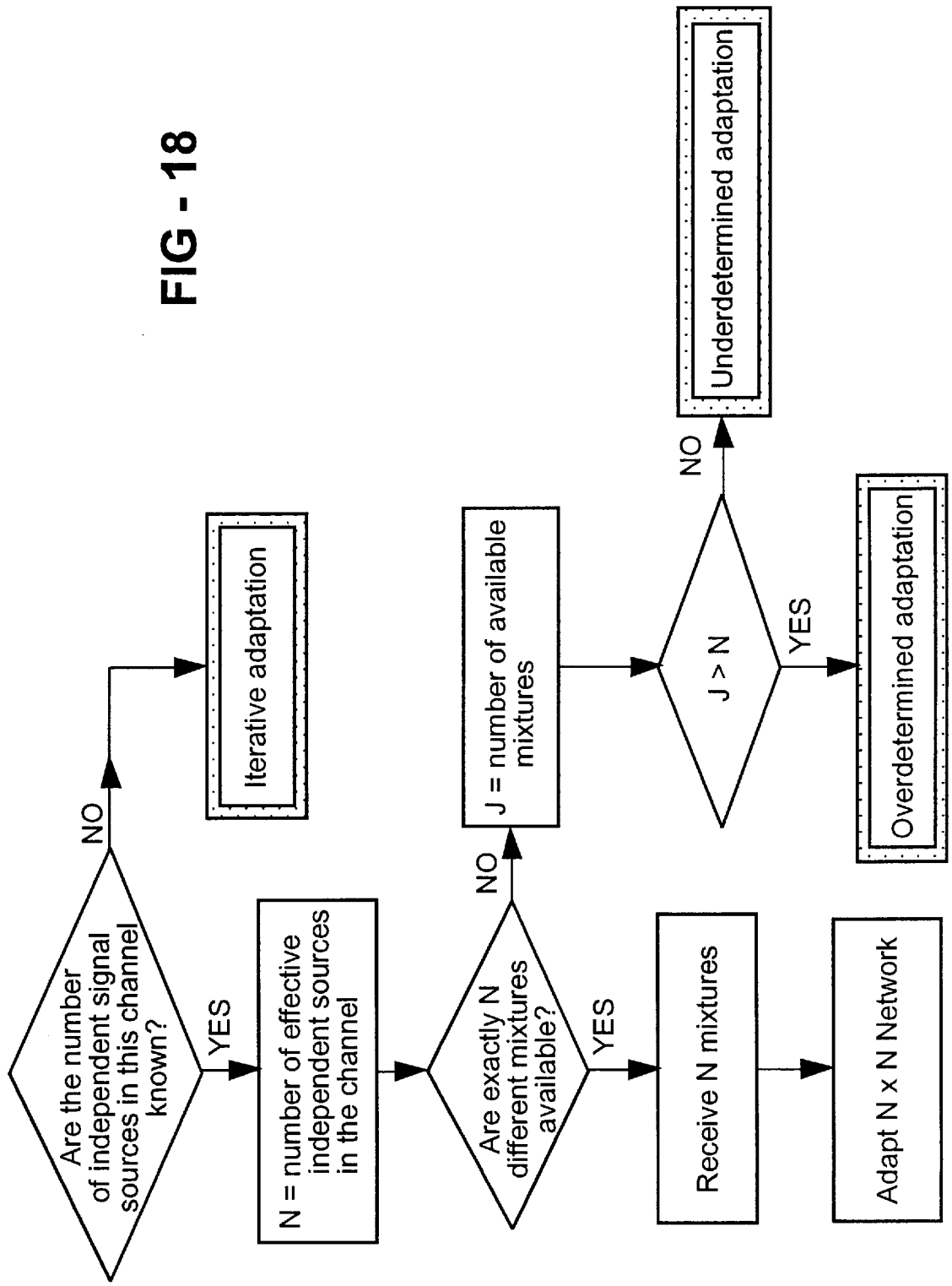
FIG. 18 is a flow chart indicating the flow of signals and orientation thereof.

The flow diagram shown in FIG. 18 describes the three procedures that are available depending on the above two items, namely, iterative adaptation, underdetermined adaptation, and overdetermined adaptation.

Within these methods themselves, different approaches are taken to accommodate situations depending on characteristics of the information source and/or the modulating signals.

Iterative Adaptation

This technique would prove useful when the number of mixtures and/or the sources contributing to those mixtures varies or is unknown. Successively increasing or decreasing network dimensions can be specified using well known techniques of prior art or new ones. In this context the dimensions of the adaptive network itself is adaptive.

Underdetermined Adaptation

This technique can be used when the number of signals that are sharing the channel or superimposed onto the same media are more than the number of distinct mixtures that can be obtained. While it would not be prudent to allow more signal sources than the number of mixtures available to the signal separation algorithm or device at the receiver end(s), this situation may arise unintentionally due to several undesired, yet at times unavoidable, circumstances of interference, multipath propagation, echoes, unanticipated delays, synchronization glitches, nonlinear or chaotic phenomena, or noise factors.

Under these circumstances three major classes of remedies will be available:

An appropriate signal separation algorithm can be preceded by various signal processing techniques, such as noise and/or echo cancellation. The objective will be to reduce the effect of the irrelevant or undesired signal sources or transmitter, channel, and receiver effects to a minimum. Depending on the assumptions one can make, several methods are available in the art and surely new ones will be formulated for the implementation of this and other systems.

An appropriate signal separation process can be followed by various signal post processing techniques, such as those for noise and echo cancellation. The objective is to reduce the effects of the irrelevant or undesired signal sources and communication artifacts after the separation process. This option would be preferable to option 1 above if one could guarantee that signals and their transmission artifacts could be contained in a single output, i.e. all signals, including echoes and multipath signals, which emanate from source 1 were superimposed on a single output of the separation algorithm. This could be accomplished by the third remedy described below.

Initial starting points of the adaptive signal separation process can be manipulated in such a manner to direct one or more of the relevant or desired signals into separate channels while the rest of the "undesired" or irrelevant signals are directed to unused or discarded separation outputs.

Hybrid techniques that utilize combinations of these three remedies can be used, as well.

It is plausible that the continuous time (or potentially the discrete time) dynamic network be able to provide one of the many solutions to the underdetermined equation. With the appropriate constraints imposed on the dynamics or the boundaries, this solution might be steered towards the desired one, given that there is really no unique solution. Such numerical practices are often used in solving underdetermined problems. As an example, one can cite one of the many underdetermined problems that arise in machine vision. For instance, the stereo correspondence to infer three dimensional structure from a two dimensional image frame is an underdetermined problem. In this ambiguous situation, one uses ordering and smoothness constraints for the points between which correspondence is to be established to identify the one solution that is consistent with the physical world among the many possible mathematically correct solutions available.

Overdetermined Adaptation

This technique can be used when the number of signals that are sharing the channel is less than the number of independent mixtures available. One can use this technique as a way of allowing a variable but limited number of signals to share the channel at the transmitter end(s) while at least that limited number of mixtures are always available to the separation algorithm or device at the receiver end(s).

Depending on the mechanism of signal separation used, the adaptation could allow for multiple overdetermined approaches, such as fault tolerant, low and high computation options. Illustration of Results of the Dynamic Signal Separation Algorithm As a special case example for N=2, we can write the following complete procedure for one possible implementation of the dynamic signal separation algorithm of this invention as four differential equations enumerated as Equations 8–11:

$$tau1 \times y1' = e1 - (y1 + y2 \times D_{12}) \quad \text{Equation (8)}$$

$$tau1 \times y2' = e2 - (y2 + y1 \times D_{21}) \quad \text{Equation (9)}$$

$$1/\eta \times D_{12}' = f(y1) \times g(y2) \quad \text{Equation (10)}$$

$$1/\eta \times D_{21}' = f(y2) \times g(y1) \quad \text{Equation (11)}$$

The variables tau1 and $1/\eta$ are the two time constants that define the dynamic window and the learning rate, respectively. The two mixtures are referred to as e1 and e2, and the two signals to be adaptively recovered to approximate the original sources are referred to as x1 and x2. $D_{12}$ and $D_{21}$ are the network coefficients (that are successively approximating the mixing coefficients $a_{ij}$), or the off-diagonal elements of the matrix D* (See Equations (6) and (7)). The two functions f () and g () are odd functions, e.g., sinh () and tanh (). As a matter of notation, "'" means rate of change derivative with respect to time, i.e. y2' is dy2'/dt.

Many types of approaches to solving such differential equations by computer exist in the art. One can distinguish methods as continuous versus discrete as well as fixed versus variable step size.

Figure 4:
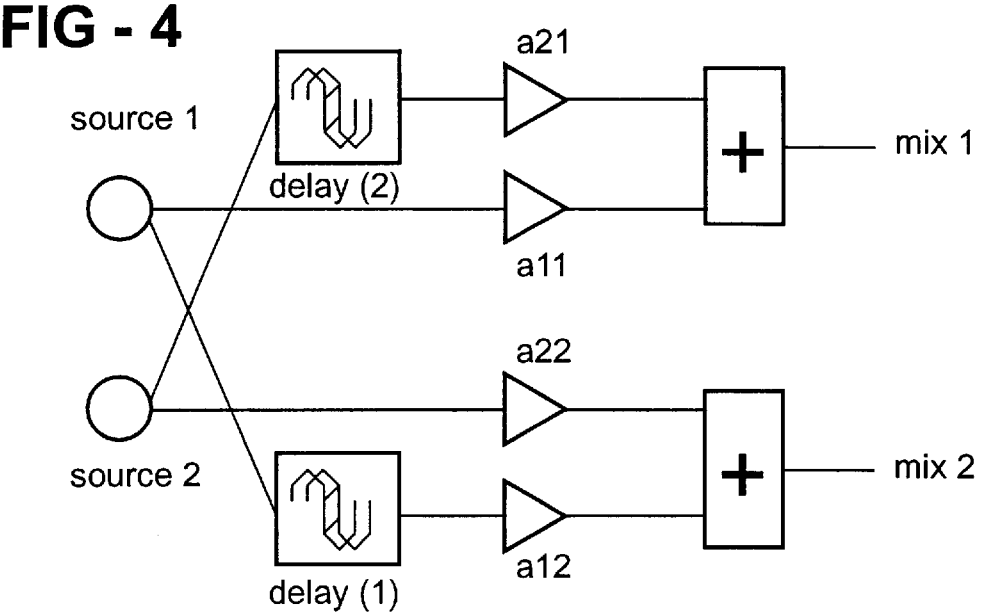
FIG. 4 is a schematic representation of two signals originating from two different sources which are dynamically mixed in the propagation medium.

An example illustration with one of these methods, namely the fifth order Runge Kutta approach follows. Previously, a particular mixing scenario involving two signals was diagrammed in FIG. 4. In mathematical terms $$\begin{bmatrix} E_1(t) \\ E_2(t) \end{bmatrix} = \begin{bmatrix} a_{11} & 0 \\ 0 & a_{22} \end{bmatrix} \begin{bmatrix} s_1(t) \\ s_2(t) \end{bmatrix} + \begin{bmatrix} 0 & a_{12} \\ a_{21} & 0 \end{bmatrix} \begin{bmatrix} s_1(t-\delta_1) \\ s_2(t-\delta_2) \end{bmatrix} \quad \text{Equation (12)}$$

In this illustration, s1(t)=sin (2000 t)

s2(t)=sin (5000 t)

$\delta_1$=0.0001 sec.

$\delta_2$=0.0001 sec.

$a_{11}=a_{22}=1.0$ $a_{12}=a_{21}=0.7$

Figure 5:
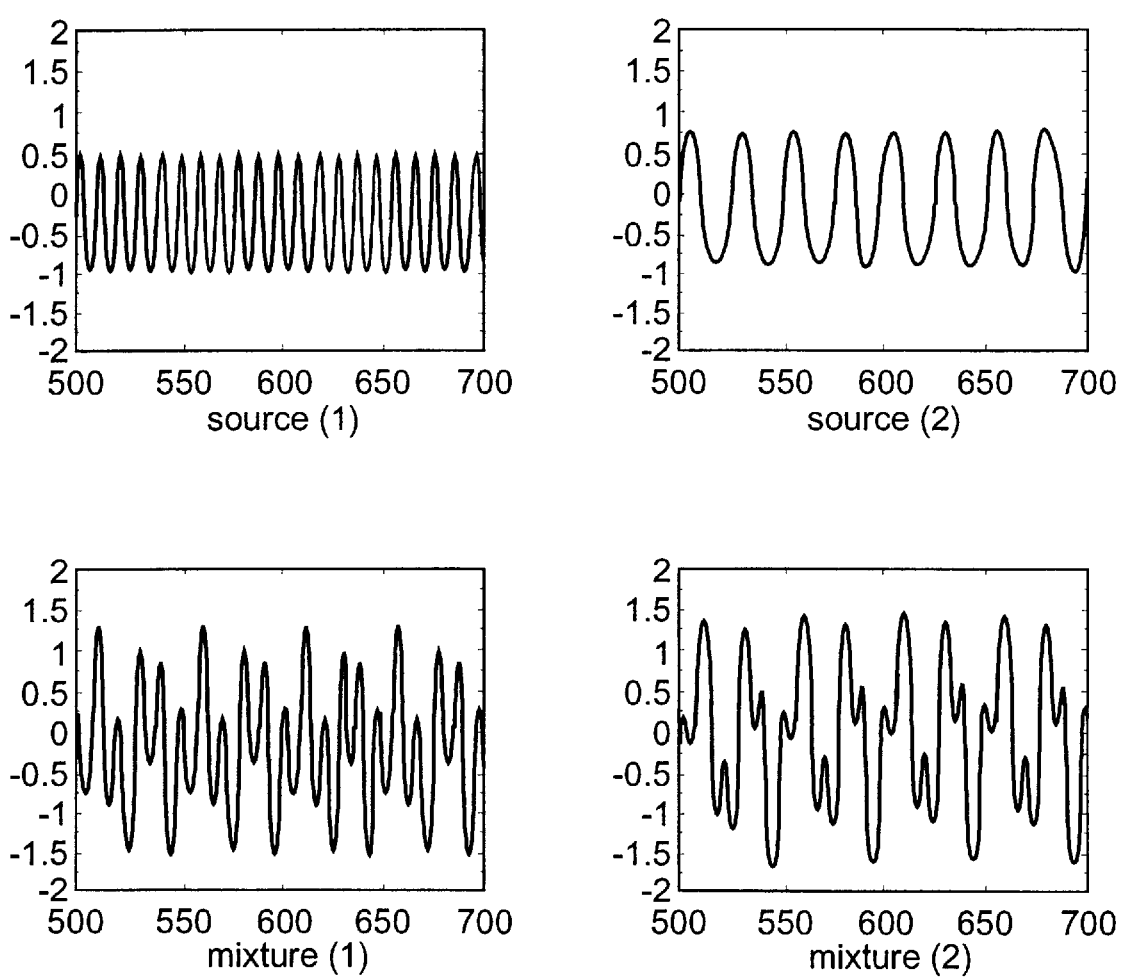
FIG. 5 illustrates sine wave sources (1) and (2) which are dynamically mixed in accord with the invention to produce mixture (1) and mixture (2), FIG. 6 are signal wave illustrations representing Herault-Jutten algorithm output, a dynamic algorithm output and a signal source (1) mixture, FIG. 7 are similar representations of sine wave mixtures representing outputs (2) and signal source (2)
Figure 10:
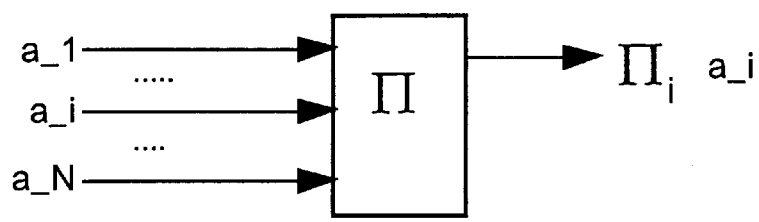
FIG. 10 is a schematic representation of the multiplication unit in accord with the inventive concepts.
Figure 11:
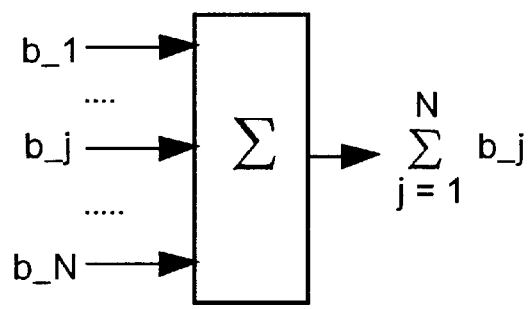
FIG. 11 is a schematic representation of the summation unit in accord with the invention.
Figure 12:
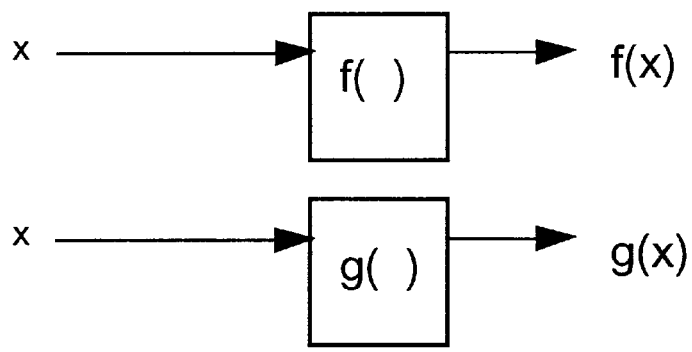
FIG. 12 is a schematic representation of the functional blocks in accord with the invention.

The two source signals s1 and s2, as well as the resulting mixed signals mixture 1 and mixture 2 are shown in FIG. 5.

Both the dynamic signal separation algorithm and the Herault Jutten algorithm of prior art have been implemented. The dynamic signal separation algorithm was shown to outperform the static linear algebraic Herault Jutten algorithm in this and many other similar cases involving relative delays.

In this comparison, exactly the same learning rates (i.e., an identical set of $\eta_{ij}$ for Equations 3 and 6) were used. In addition, the identical integration method and the step sizes were utilized. Table 1 summarizes the exact parameters.

FIGS. 6 and 7 show the results which illustrate this comparison between the method of this invention and that of prior art. The signal separation task can be achieved using the dynamic approach of this algorithm whereas the method of prior art fails to achieve satisfactory separation.

A second example suitable for discrete systems is shown in FIGS. 8 and 9 wherein two mixed signals are shown which originate from two different sources (Series1 2 kHz sine wave, and Series2 a 5 kHz sine wave). The mixing involves relative delays in addition to gains determined by the entries $a_{ij}$ of the mixing matrix. The exact delays are 20 microseconds for the 2 kHz signal and 30 microseconds for the 5 kHz signal. This is an up to (30/200×360) 54 degree phase shift. The mixed signals are sampled at a fixed rate, namely at 100 kHz. The Herault-Jutten algorithm fails, whereas the dynamic differential equation-based signal separation algorithm of this invention is able to separate the signals. It should be noted that in this comparison no assumption is made regarding the mathematical characteristics of the incoming signals. Both algorithms under comparison used only the same set of sampled values, without interpolating between samples. The Herault Jutten algorithm was carried out by evaluating the algebraic formulation in Equations (2) and (4) for each sample point. As before, the same learning rates (i.e., an identical set of $n_{ij}$ for Equations 3 and 6) were used for both the Herault Jutten algorithm and the algorithm specified by this invention. For carrying out this particular implementation of the invention, an explicit second order finite difference scheme of fixed step size was used to resolve the differential formulations in Equations (8)–(11). This approach replaces derivatives as:

$$y'(t) \rightarrow (3*y(t)-4*y(t-dt)+y(t-2*dt))/(2*dt)$$

and all function values as:

$$y(t) \rightarrow y(t-dt)$$

where dt is the time step size. This way current values for y1, y2, $D_{12}$, $D_{21}$ can be found using the values from the last two steps. This is a simple second order algorithm that uses three-term backward difference rule based on quadratic interpolation.

The particular process coded in computer C language solving Equations (8)–(11) is as follows. This should be understandable to all those skilled in the art of programming:

```
/* initialize values */
y1[0]=numerical_value_1;
y1[1]=numerical_value_2;
y2[0]=numerical_value_3;
y2[1]=numerical_value_4;
D12[0]=numerical_value_5;
D12[1]=numerical_value_6;
D21[0]=numerical_value_7;
D21[1]=numerical_value_8;
e1=first_mixture1_sample;
e2=first_mixture2_sample;
for
(i=3;i<=number_of_sample_points;i++){
/* compute current values from previous ones */
D12dot=η* sinh(y1[i-1])*tanh(y2[i-1]);
D21dot=η* sinh(y2[i-1])*tanh(y1[i-1]);
D12[i]=(2*dt*D12dot+4*D12[i-1]-D12[i-2])/3;
D21[i]=(2*dt*D21dot+4*D21[i-1]-D21[i-2])/3;
y1dot=(e1-(y1[i-1]+y2[i-1]×D12[i]))/tau1;
y2dot=(e2-(y2[i-1]+y1[i-1]×D21[i]))/tau1;
y1[i]=(2*dt*y1dot+4*y1[i-1]-y1[i-2])/3;
y2[i]=(2*dt*y2dot+4*y2[i-1]-y2[i-2])/3;
/* go back and iterate again */
e1=next_mixture1_sample;
e2=next_mixture2_sample;
}
``` where dt is step size, e1 and e2 are the sampled (mixed) signals, y1and y2 are the original source approximation signals, and D12 and D21 are the network coefficients. All signals with the _dot prefix represent derivatives.

The dt (step size) value is generally equal to the sampling rate of the incoming signal. However, this may not be true, especially of the signal is interpolated between sample points. This interpolation should take into consideration the nature of the signal(s) and apply the correct interpolation method. The simplest method is linear interpolation. For many times of signals other methods such as splines may be more appropriate. In this particular example, no interpolation was necessary since the step size is equal to the sampling interval which equals one tenth of the highest frequency signal's wavelength.

Implementation Options

There exist several methods of approximating the solution of the equations presented. These are:

1. software emulation on a computer or general purpose computing apparatus by coding the algorithm a high level language,
2. dedicated computer hardware in the form of implemented circuits which yield the solution to the set of differential equations in or near real-time, and
3. computer hardware assisted or accelerated emulation, e.g., via a dedicated signal processor execution in an optimized architecture structure.

Each option offers advantages and disadvantages. Software emulation is suitable for general unformulated mixes, acoustic signals, or as front end to other systems for recognition of signals. Dedicated hardware implementation or circuit rendition are compact and consume little power yet offer less flexibility. These may be suitable for separating well defined signals under a limited number of circumstances. Dedicated signal processor implementation could be fast enough with emerging high performance digital signal processors (DSP), microprocessors, application specific integrated circuits (ASIC), programmable devices, including but not limited to field programmable gate arrays (FPGA), programmable logic arrays (PLA), or other custom built or programmed automated structures that compute fast multiplication and addition and offer flexible high precision. It may be convenient to integrate the signal separation process to the program on an appropriate computing device already included to perform the other signal processing functions particular to the device, as well.

Implementation Option I: Software Emulation

Software emulation is among the claims for implementation option for this invention and involves the coding of the differential equation algorithm in a particular language in a way that it makes it possible to automatically execute it on a particular processor. High level languages such as FORTRAN and C/C++ have supporting processor specific compilers that allow the code to become portable. On the other hand, more recent languages such as Java are platform independent so that the algorithm can be coded to run on multiple platforms in a network environment.

An example of a software implementation was given in the section titled Illustration of Results of the Dynamic Signal Separation Algorithm. This is essentially equivalent to the C code corresponding to this algorithm.

Implementation Option II: Dedicated Physical System or Circuit

Successful dedicated circuit implementations must incorporate the changes associated with the dynamic signal separation algorithm of this invention to take the dynamic properties of the sensors and the mixing medium into consideration.

There are two possible representations of the entries or values of the parameters of the algorithm in a dedicated circuit implementation. These are voltage and current. This means that the value of the matrix entry $d_{ij}$ is represented by a voltage (with reference to a fixed voltage) or a current. Each has its advantages and disadvantages. In recent years, current mode computation has become popular with the emergence and success of low noise silicon manufacturing.

Hybrid representations are also plausible, e.g., the $d_{ij}$ values and y can be represented as voltages, whereas their product is represented as a current.

Regardless of which combinations of current/voltage representations are chosen, there are five basic components of the circuit:

1. a multiplication block,
2. a summation block,
3. a block for implementing f (x),
4. a block for implementing g (x), and
5. an adaptation block.

The multiplication block is needed for computing of the products, such as that between the elements of the matrix D, (i.e., $d_{ij}$) and the elements of the output signal y (i.e., $y_j$).

The summation block is needed to add the values of the products $d_{ij}\,y_j$ together and subtract the sum from $e_i$.

The two functions f and g must be evaluated to determine the mixing coefficient weight updates.

Multiple adaptation blocks are needed to adjust the values of $d_{ij}$ and $y_i$ in the manner described by the algorithm.

The following expands on this further.

Multiplication block provides the means of computing the value of the product of two variables. The variables can be both currents, both voltages, or one a voltage while the other is a current. In many cases using voltage, the value may actually be a voltage difference, or voltage with respect to a reference potential. The computed value is naturally either a current or a voltage. The actual result need not be exact, in fact one can offset or proportion the resulting current or voltage readily using well known circuit practices. What is needed is a result proportional to the product, or a result that can be used successfully instead of the product, either with or without some conditioning.

For instance, a well-known analog circuit called the Gilbert multiplier takes as input two voltage differences and outputs a current that is proportional to their product. The output current is not exactly the product but can be used in its place. In a similar manner, one can use the channel current of a transistor operating in its linear region to approximate the product of its gate voltage and the voltage difference between its source and drain.

The block for computing summations can most readily be approximated by a wire, provided that all variables to be added are currents, and one can guarantee that the directions of currents to be added are opposite of those to be subtracted, e.g., the currents into the node are added; whereas the currents flowing away from the node are subtracted, or vice versa.

There are several ways to add voltages, as well, and most of these involve conversion into a current, summation by wire, and then a conversion back from current to voltage.

The adaptation block lies at the heart of this innovation. The updating of the weights that subtract away the mixed components must adapt continuously to both the delay and the mixing coefficient. The rate of adaptation and the values that set the direction and magnitude of the change should be accommodated.

Figure 13:
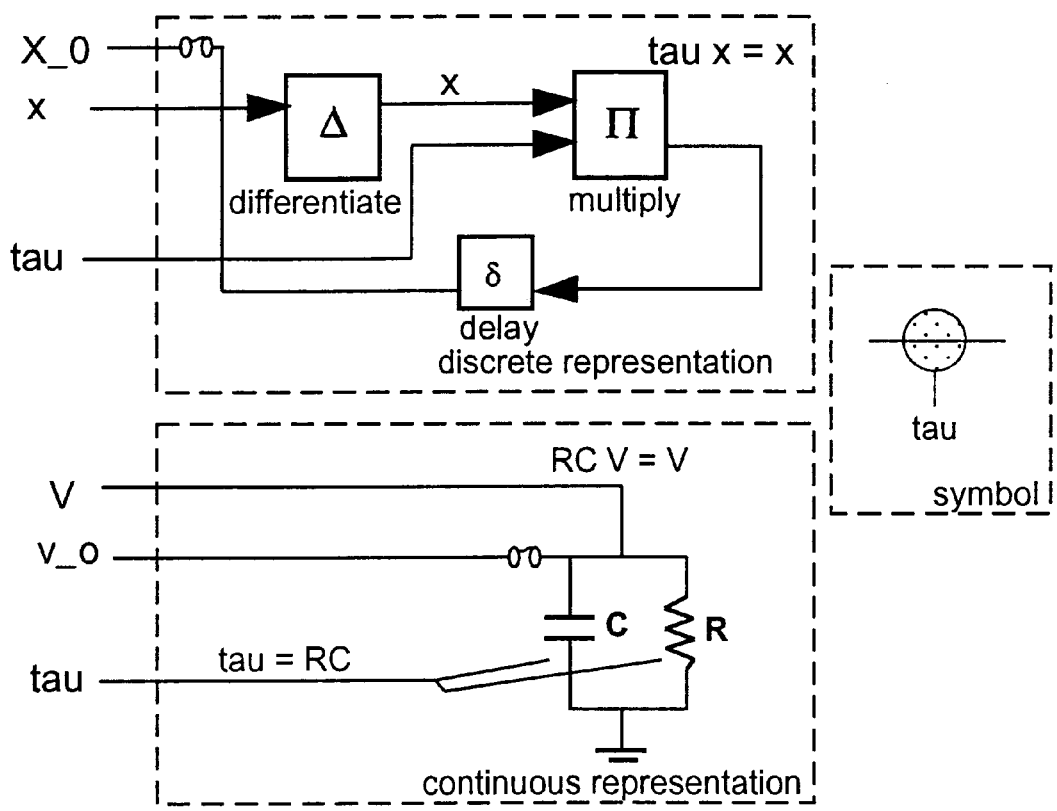
FIG. 13 is a schematic representation of the adaptation block showing continuous and discreet representations for the differential equation shown.
Figure 14:
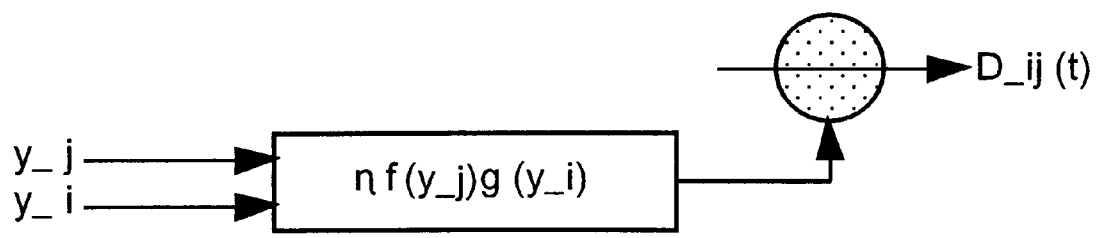
FIG. 14 is a schematic representation of the adaptation structure for the weight update block.
Figure 15:
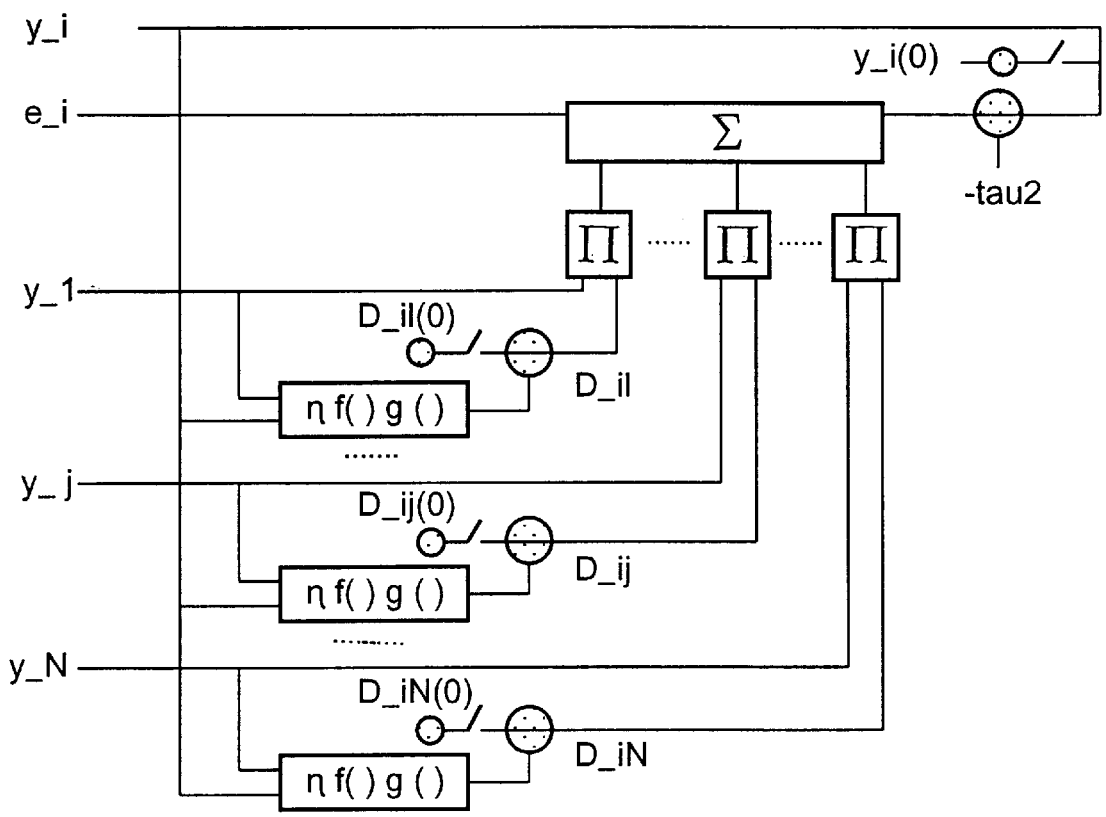
FIG. 15 is a schematic representation of the overall circuit architecture for one signal wherein this circuit arrangement is repeated as many times as there are signals to be separated and/or mixtures received.

The discrete implementation of such an adaptation has already been embodied in the algorithm listed in the section Illustration of Results of the Dynamic Signal Separation Algorithm, above. The actual circuit implementation can involve mechanisms to implement this adaptation discretely or continuously. Continuous implementations will generally be more elegant yet potentially harder to stabilize in order to obtain repeatable and consistent results. The continuous methods take advantage of the fact that there are differential equations that govern the trajectories of voltages and/or currents in circuits. For instance, if one can impose the appropriate values of capacitance and resistance at a node (see FIG. 13), after initialization with $V_0$, the voltage at the node will evolve according to the differential equation $$C\dot{V}=-V/R \qquad \text{Equation (13)}$$

In this case one can view the voltage at that node as the solution to the differential equation of the form $$\tau\dot{y}=-y \qquad \text{Equation (14)}$$

In this case, t is the time constant of the Resistance—Capacitance circuit, numerically equal to the product of resistance and capacitance values, RC. So a circuit node with resistance and capacitance to ground will fit this dynamic profile.

In general, the circuit topology and effective values of capacitance, resistance and inductance will determine the specific dynamics at a circuit node.

If $\tau$ is anticipated to be relatively small, one can rely on parasitic capacitances and leakage currents in the circuit to in effect generate the update dynamics. This invention, however requires slowing down the dynamics in relation to the amount of delay.

Discrete implementations—such as those involving pulses of charge or currents proportional to the desired adaptation rate used to update the voltages representing the mixing coefficients, could be easier to stabilize to get repeatable results from, and thus, would perform more consistently.

The implementation of the adaptation blocks also requires that a product $\eta f(x)g(y)$ be computed for any given value of $\eta$, x, and y. It may also be desirable to have programmable f() and g()—so that one has the flexibility of implementing the most appropriate function tailored to the properties of the mixtures or the mixing environments.

Previous implementations have experimented with the functions sinh() and tanh() for f() and g(), respectively. Several subthreshold circuits exist for the approximate computation of these functions. These basic components introduce a relationship between the input voltage V expressed in units of kT/q (where k is Boltzman's constant, q is the charge of an electron, and T is temperature), and the output current:

$$I_{out}^{\tanh} = I_b \tanh\frac{\kappa V}{2} \qquad \text{Equations (15) and (16)}$$
$$I_{out}^{\sinh} = 2\omega I_0 e^{\kappa(V_b-\delta V)}\sinh\kappa V$$

It is important to observe that some of the parameters that the above currents $I_{out}$ depend on are:

1. the biasing voltage $V_b$,
2. the ratio of the width of the biasing transistor to the width of the arm transistors $\omega$, and
3. the offset voltage $\delta V$.

Implementation Option III: Hardware Accelerated Emulation

Hardware accelerated emulation is a popular path taken today for many applications associated with digital signal processing. Dedicated signal processor implementation could be fast enough with emerging high performance digital signal processors (DSP), microprocessors, application specific integrated circuits (ASIC), programmable devices, including but not limitted to field programmable gate arrays (FPGA), programmable logic arrays (PLA), or other custom built or programmed automated structures that compute fast multiplication and addition and offer flexible high precision. It may be convenient to integrate the signal separation process to the program on an appropriate computing device already included to perform the other signal processing functions particular to the device, as well.

Figure 16:
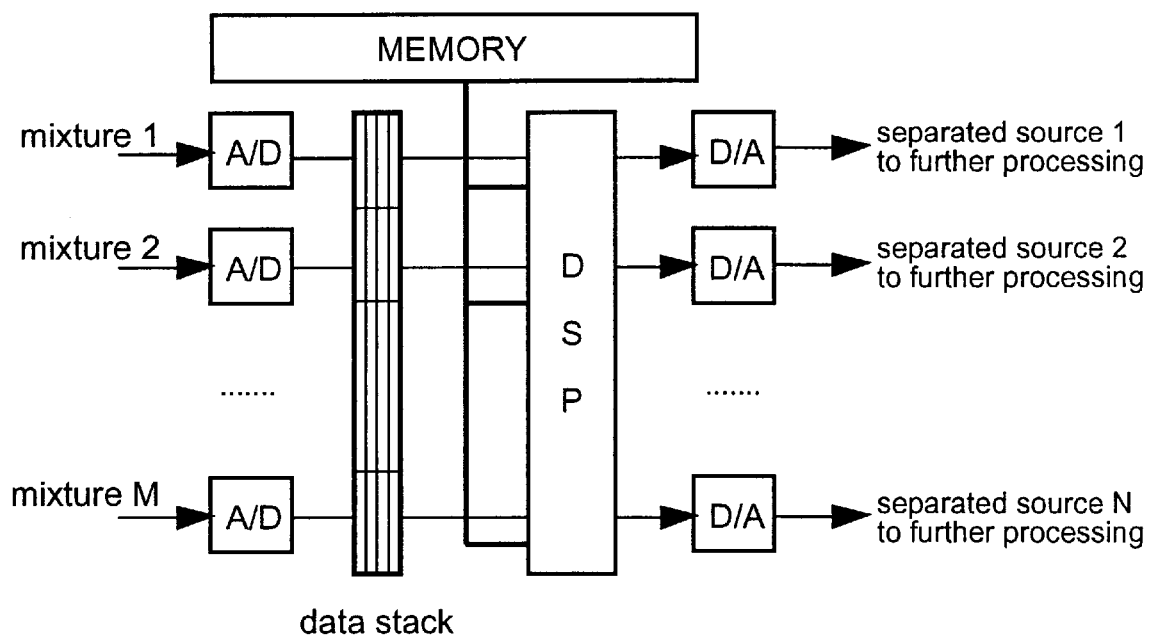
FIG. 16 is a schematic representation of the DSP implementation architecture wherein A/D represents analog to digital conversion and D/A represents digital to analog conversion.

One possible digital signal processor implementation of the dynamic signal separation algorithm of this invention is shown in FIG. 16. The procedure is as follows: The incoming signal mixtures are digitized and stored in the data stack. These values are then used as inputs to the programmed procedure for implementing the separation algorithm of this invention. One or more digital signal processors (DSP) and/or DSP's with multiple functional units can be used to carry out this process. The DSP units must be programmed to carry out the steps needed to solve the equations that are associated with the algorithm. This program can be obtained by compiling the high level language to translate the procedure into assembly or machine language which the DSP can decode and carry out. Custom crafted machine language can further accelerate the execution of the algorithm by optimizing the procedure for a particular DSP architecture or combination functional units.

The outputs from these processes which form the approximations to the source signals can then be stored, converted to analog values, and/or processed further. Examples of further processing include signal conditioning, classification, recognition, demodulation, etc.

Figure 19:
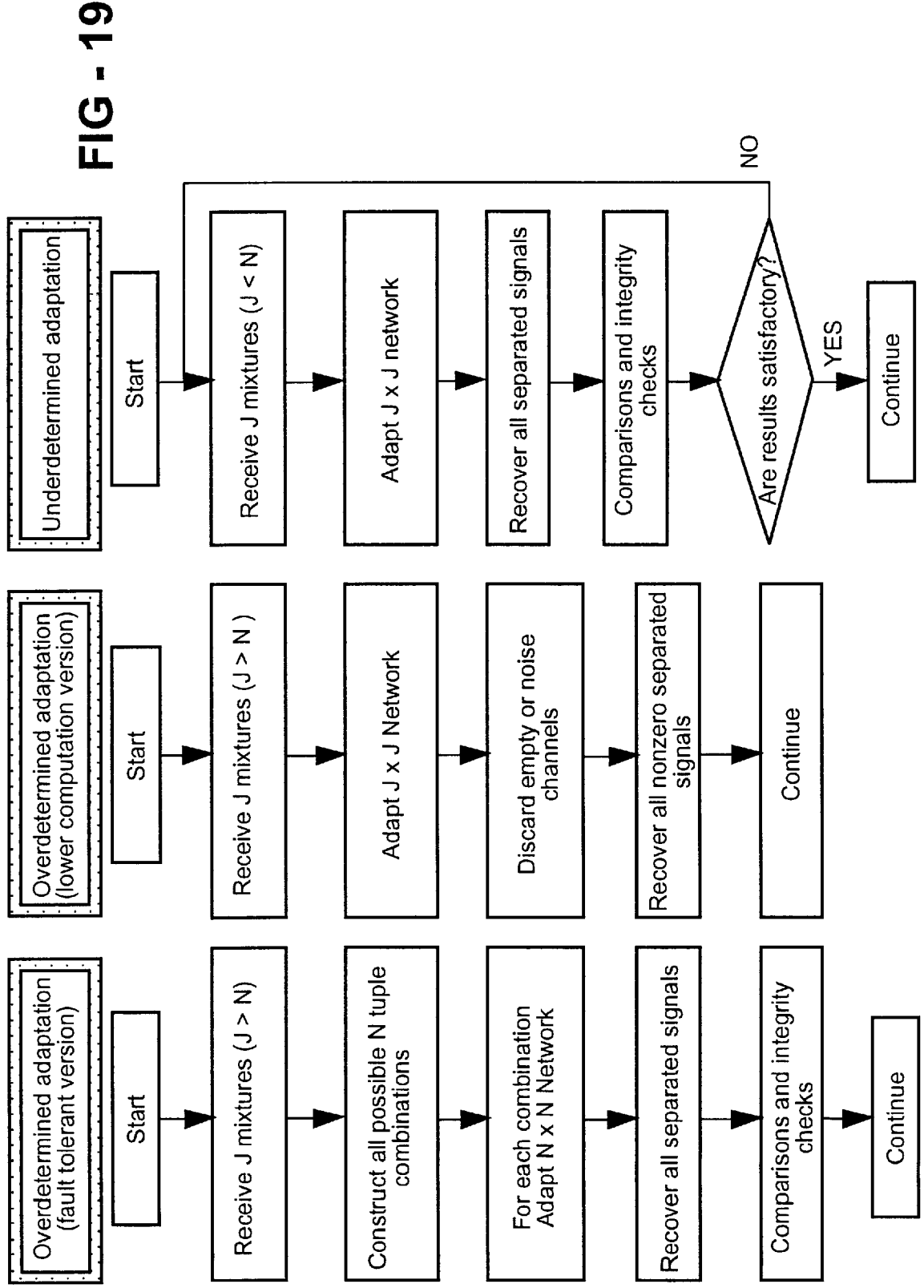
FIGS. 19 and 20 are also block type flow charts indicating various steps to be followed in the practice of the invention.
Figure 20:
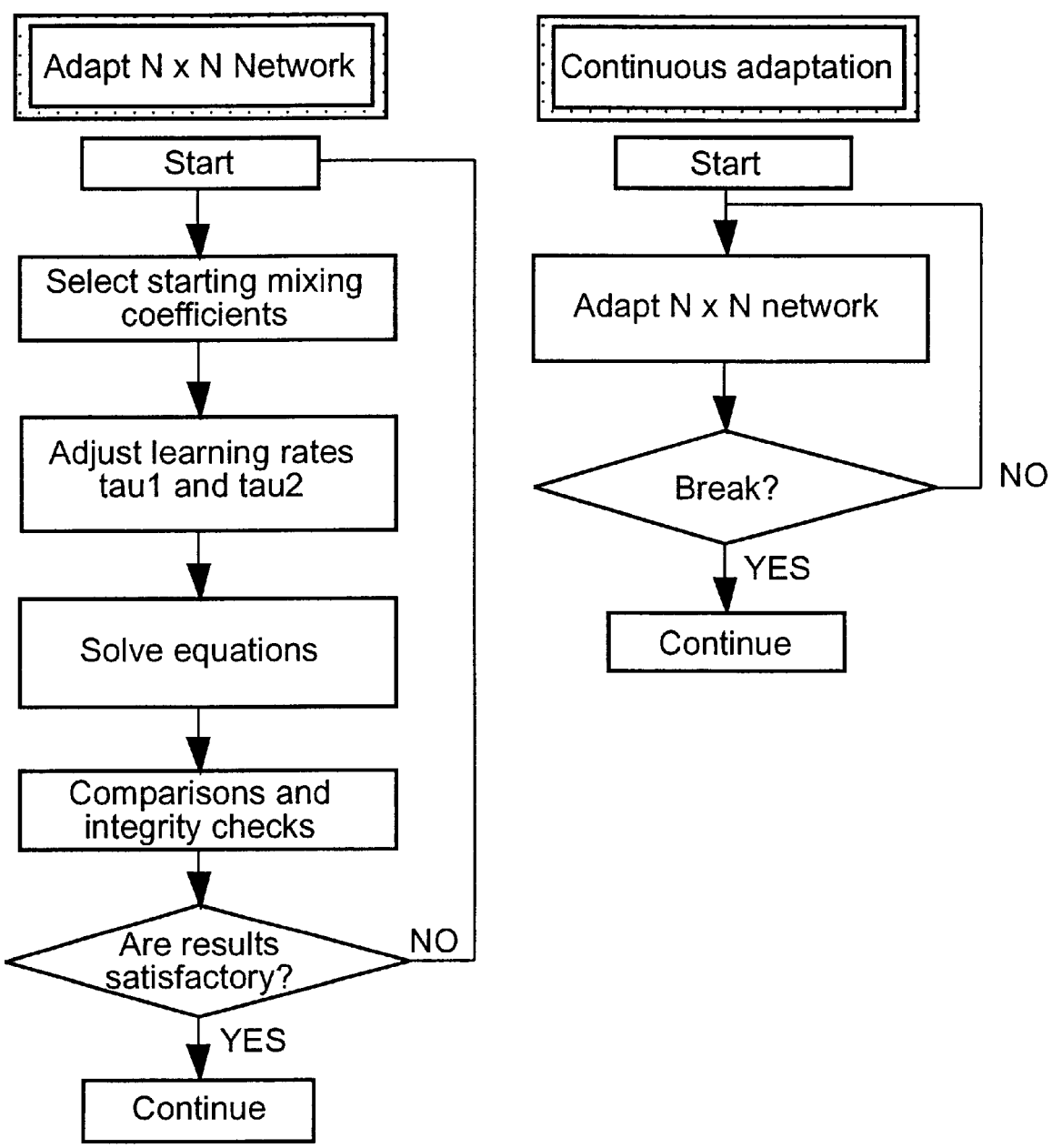

Several sophisticated procedures that handle overdetermined (where number of mixtures are greater than the number of sources), underdetermined (where number of mixtures are less than the number of sources), varying (where the number of sources and mixtures vary) or unknown have been outlined in flowcharts of FIGS. 18, 19 and 20. Furthermore, additional error checking, data integrity checking, and data identification schemes of prior art or inventions can enrich the possibilities and the application domains as well as robustness and reliability of the procedure. These additional steps can readily be programmed into a DSP by those skilled in the art of DSP programming.

Figure 17:
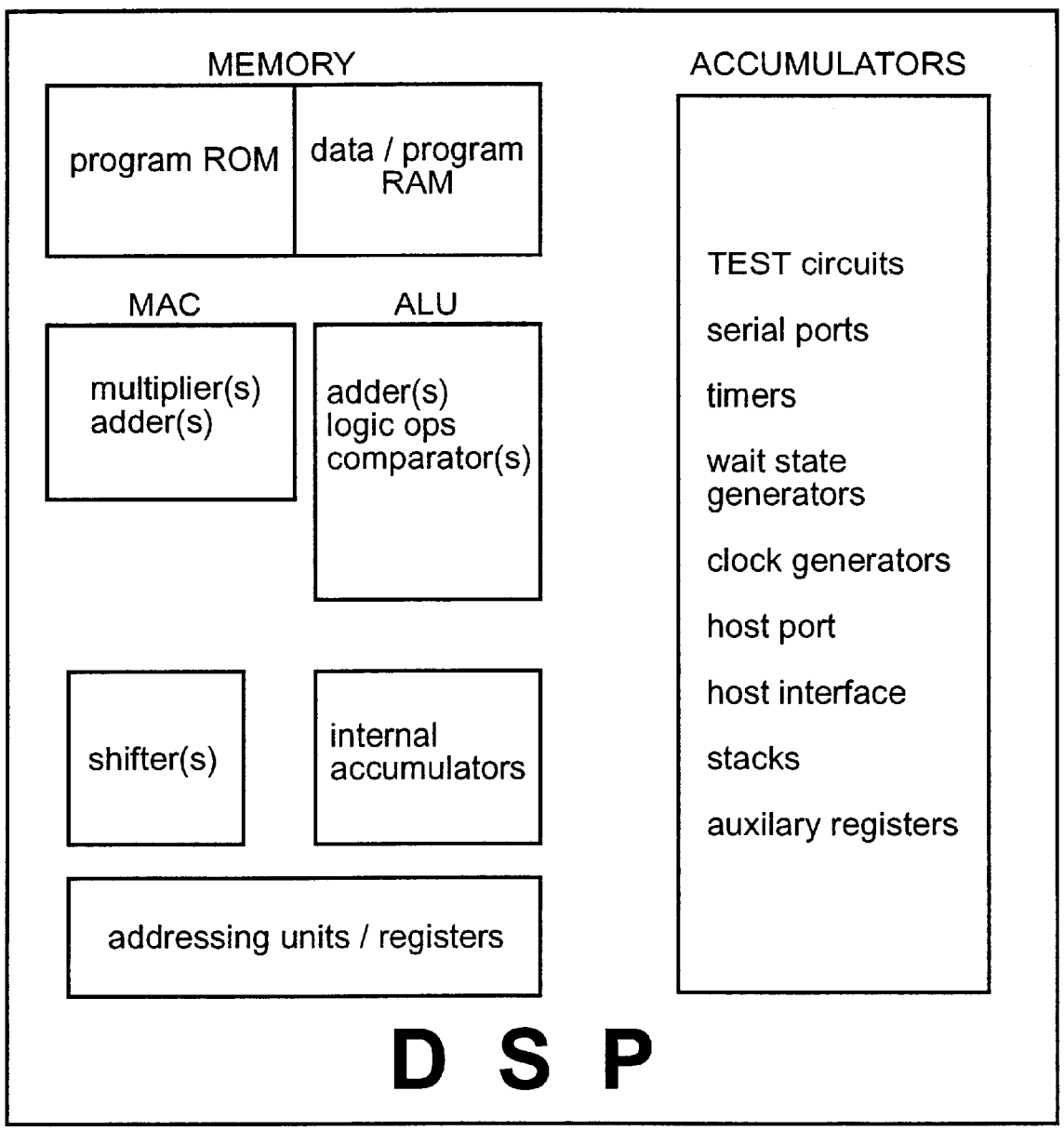
FIG. 17 is a schematic illustration of a typical DSP internal architecture stacks and A/D and D/A can be integrated into this structure for single chip solutions, MAC representing a multiplier accumulator and ALU representing an arithematic logic unit.

FIG. 16 schematically illustrates the separation of signals from M sources. In FIG. 16, A/D stands for analog to digital conversion, and D/A represents digital to analog conversion. The internals of the DSP architecture may include a variety of functional units and different configurations are possible depending on the nature of the application, the number of mixtures, the desired accuracy and degree of separation, etc. In FIG. 17, a typical DSP internal architecture is shown and the A/D and D/A could be integrated into this structure for single chip solutions in the practice of the invention.

To better appreciate the wide variety of applications in which the inventive concepts may be utilized, the following examples of applications are set forth, the general classification of such applications being separately titled and each title include sub-classifications under the associated general category:

NON-MULTIPLEXED MEDIUM OR CHANNEL SHARING

A need for medium or channel sharing arises when a number of media or channels need to be shared between multiple signal sources. In general, the number of signal sources and media or channels may vary. Often, the number of channels or media available are less than the number of signal sources, which necessitates a method of allocating and sharing these resources among multiple users or signals. The signal sources may represent any of, or a combination of a variety of communication signals, such as modulated carriers, bit streams, as well as signals embodying utterances of speakers, speeches, sounds, music, radio based or light based wireless transmissions, electronic or optic communication channels, still images, video, as well as echoes, reverberations thereof, and other noise sources, that share or are superimposed on the same channel or channels. Prior art provides four main methods of channel or medium sharing:

I. frequency division,
II. time division,
III. code division, and
IV. spread spectrum.

Figure 21:
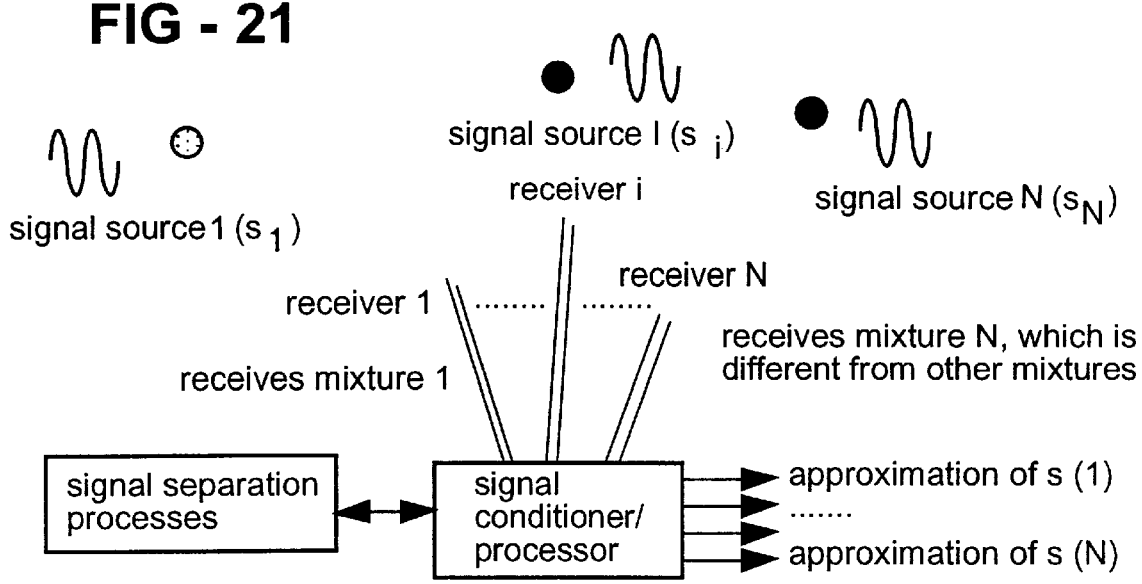
FIG. 21 is a schematic illustration of multiple signals composed of mixtures of multiple source signals as received in a softwire channel.
Figure 22:
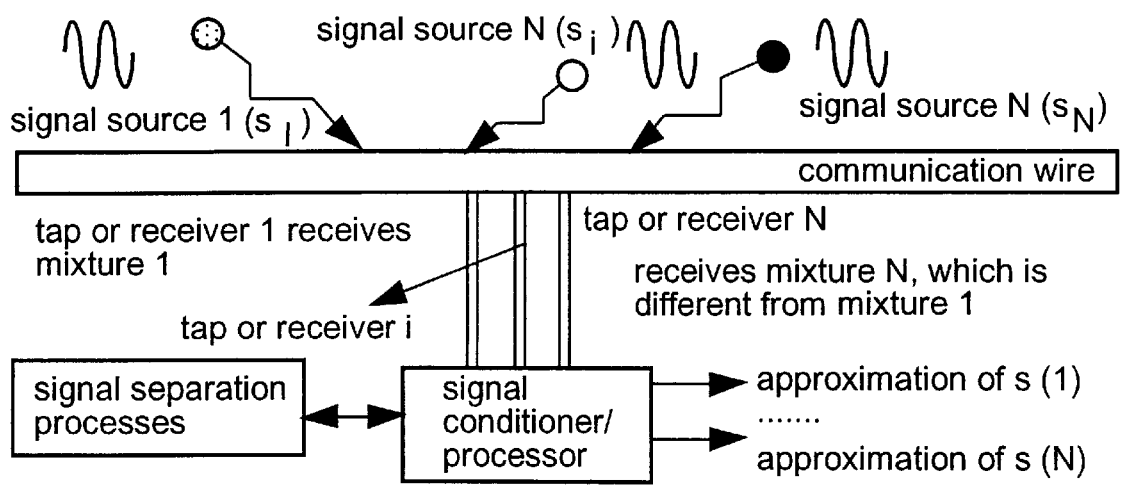
FIG. 22 is a schematic illustration of multiple signals composed of mixtures of multiple source signals as received from a hardwire channel.

Successful application of this invention to medium or channel sharing introduces an entirely new method separate and apart from these four techniques of prior art. The invention provides a generalized framework that allows channel sharing without the need for predetermined division techniques. In this new paradigm, the sharing of a particular medium or channel does not require the implementation of any particular method at the transmitter of the signal. In fact multiple transmitters could in effect share the same medium or channel using different modulation methods. As an example, a digital transmission could simultaneously occupy the same frequency band as an analog transmission without the need for assignment of codes or the use of spread spectrum techniques. This new set of channel or medium sharing techniques are described and demonstrated as follows:

Referring to FIGS. 21 and 22:

1. Multiple sources to transmit messages in a narrowband or broadband channel simultaneously by way of modulating the signals onto several asynchronous carriers and transmitting these signals simultaneously across the channel. The resulting composite signal in the channel may consist of modulated signals that have overlapping spectra.

2. One or more copies of the composite signals are obtained. For a hardwired channel, FIG. 22, this may require multiple wiretaps in order to obtain different combinations, filtered versions, or superpositions of the mixture of signals that are sharing the channel. Another option is the use of modulation techniques that modify the power of the carrier signal so different compositions are available at different intervals. For a soft wired channel, FIG. 21, obtaining multiple copies of the composite signal in the channel can be accomplished using techniques that yield different copies of the composite signal, such as directional antennas or strategically placed receivers.

3. Using the appropriate composition of the methods described for separating mixed or superimposed signals, the original signal sources are recovered. One can choose to use the iterative, underdetermined, or overdetermined adaptation procedures depending upon whether or not a known number of signals are sharing the channel, and upon the number of nonidentical composite signal mixtures available. This process could be carried out before or after the demodulation of the communication signal, as appropriate.

Medium or channel sharing is a technique that can be applied to multiple application domains some of which are listed below:

Channel Sharing in Communications

The channel sharing concept applies foremost to telecommunications, both analog and digital. In addition, both wireless and hard wired communications can benefit from this new technique of medium or channel sharing.

Figure 23:
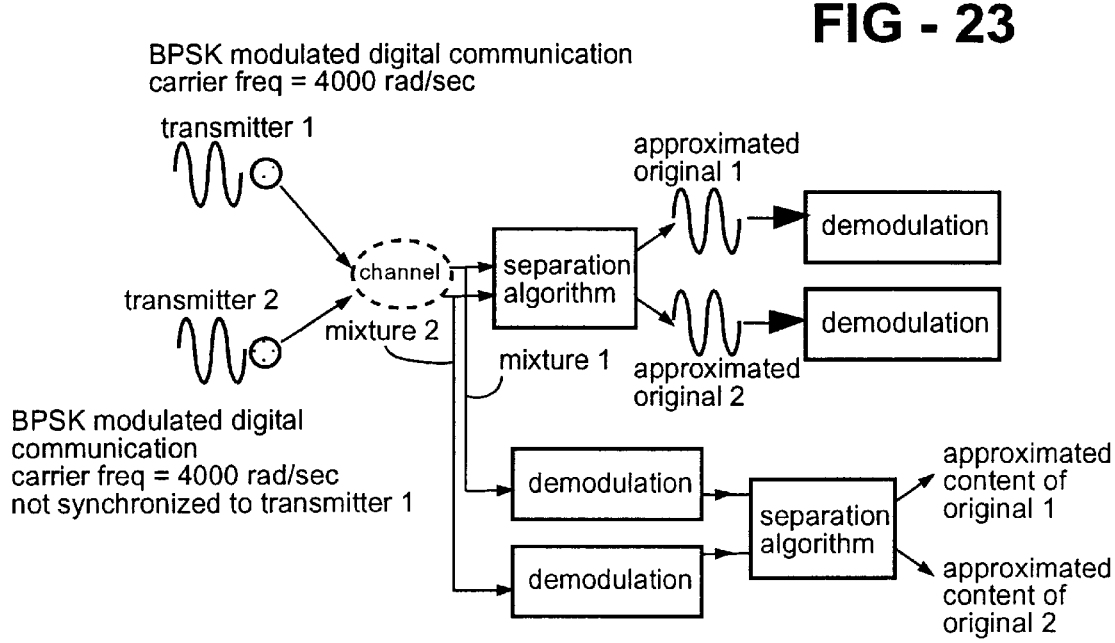
FIG. 23 is a flow chart of an example implementation of the invention using Binary Phase Shift Keying modulation of two asynchronous identical carrier waves.

The concept is illustrated in FIG. 23 for a specific modulation technique, namely Binary Phase Shift Keying (BPSK) in transmitting two digital data streams (FIG. 24). With respect to FIG. 24, ten signals are shown numbered consecutively from top to bottom. Signal 1 is the first mixture obtained from the channel, composed of a combination of source 1 and 2. Signal 2 is the signal obtained after demodulation of signal 1. Signal 3 is the second mixture obtained from the channel different from signal 1, composed of a combination of source 1 and 2. Signal 4 is the bit stream obtained after demodulating signal 3. Signal 5 is the first output of the signal separation process. Signal 6 (darker line) is the actual bit stream transmitted from source 1. Signal 8 is the second output of the signal separation process. Signal 9 (darker line) is the actual bit stream transmitted from source 2. Signal 10 is the bit stream obtained by demodulating signal 8. Both streams are modulated using the identical carrier frequency (4000 rad/sec) however the carrier waves are out of phase with one another. Two mixtures of these signals are obtained using the following mixing matrix entries (Refer to the simple practical mixing problem described in the Summary of Invention.) as follows:

$$\begin{bmatrix} a_{11} & a_{12} \\ a_{21} & a_{22} \end{bmatrix} = \begin{bmatrix} 1 & 0.03 \\ 1.9 & 0.3 \end{bmatrix} \text{ and } \delta_1 = \delta_2 = 0.0007854 \text{ sec.}$$

One can observe that both mixtures visually resemble the s1 signal. If one simply decoded the mixtures, an entirely intolerable error rate would be observed. If one demodulates the separated signals, the data would be free of errors.

The channel sharing paradigm extends over multiple types and means of communications. Radio based as well as light based wireless communication channels can be shared. This affects virtually all types of wireless communications, such as, but not restricted to cellular, infrared, meteor burst, microwave, packetized data over radio, personal communication systems PCS/PCN, satellite, specialized mobile radio, troposcatter, and two way radio communications. Wireless LAN applications and other wireless applications such as PBX, data, fax, email and Internet access are among potential application domains.

For communication over wire it may be possible to obtain nonidentical mixtures of the signals that are required for the signal separation algorithm through wire taps that are strategically placed (FIG. 22) or through a synchronous or asynchronous signal power modulation method. The latter requires that a division technique be applied to the power of the signal only. The signals themselves continue to share the channel or medium simultaneously and could still be using the same band of frequencies.

The nonmultiplexed channel sharing application of the invention can also be viewed as an alternate to cellular communications, or a means of relaxing some of the stringent requirements thereof. The objective in cellular communications is reuse of spectrum. This is accomplished by restricting the reach of a signal into a single cell. All neighbors of that cell use other frequency bands. The same frequency is repeated in the cell structures so that no neighboring two cells use the same frequency band. In the nonmultiplexed channel sharing application, such a strict physical division is not required. The cell boundaries may be less defined and neighboring cells can use the same frequencies. The cell size need not be a function of the number of anticipated users within a cell. Adaptive interferer rejection can be used to better isolate signal sources in a cellular environment. This would also simplify cell handoff.

Reuse of Already Allocated Spectra

The channel sharing concept creates the opportunity to reuse spectrum that may already be in use. Currently once a part of the spectrum is auctioned off to a particular user or users, it is considered unusable by others. For instance, the fact that the FM radio station is operating at 90.3 mega hertz precludes another person's use of a suitably wide spectrum around 90.3 mega hertz. This restriction has caused the crowding of unlicensed radio frequencies, which currently are limited to a small portion of the spectrum and this congestion is expected to increase further by the explosion in communication devices. Using the signal separation described in this invention, it would be possible to reuse already allocated spectrum without disturbing the application for which it was intended. For instance, sufficiently low power broadcasts over the same spectrum as a radio or television station could be used locally to communicate between network receiver or transmitter devices.

This may give the opportunity to eventually merge reception of broadcast signals, i.e., TV and radio as well as custom, individual and directed signals such as paging, telephone, video on demand and video conferencing on the same mobile device.

Infrared Communications Using Diffused Light

Short-range wireless digital communication can be performed using infrared beams of wide extent, or diffused light, which avoid the need for precise alignment between transmitter and receiver. Both directed and diffuse infrared links are now being widely used for data communication at bit rates as high as several Mb/s.

As a communication medium, infrared offers several advantages over radio, including: (a) freedom from multipath fading, (b) availability of a vast bandwidth that is unregulated worldwide, and (c) infrared is blocked by opaque barriers, preventing eavesdropping and interference between communications in different rooms. However, the designer of high-speed infrared systems faces several challenges. Many environments contain an intense infrared ambient, which leads to a shot noise that limits the SNR (signal to noise ratio) of a well-designed receiver. While this background can be overcome by use of high transmitter power levels, the accompanying high power consumption may be unacceptable for applications using portable transmitters. Multipath distortion causes intersymbol interference, potentially impairing signaling at rates above about 10 Mbaud.

Figure 25:
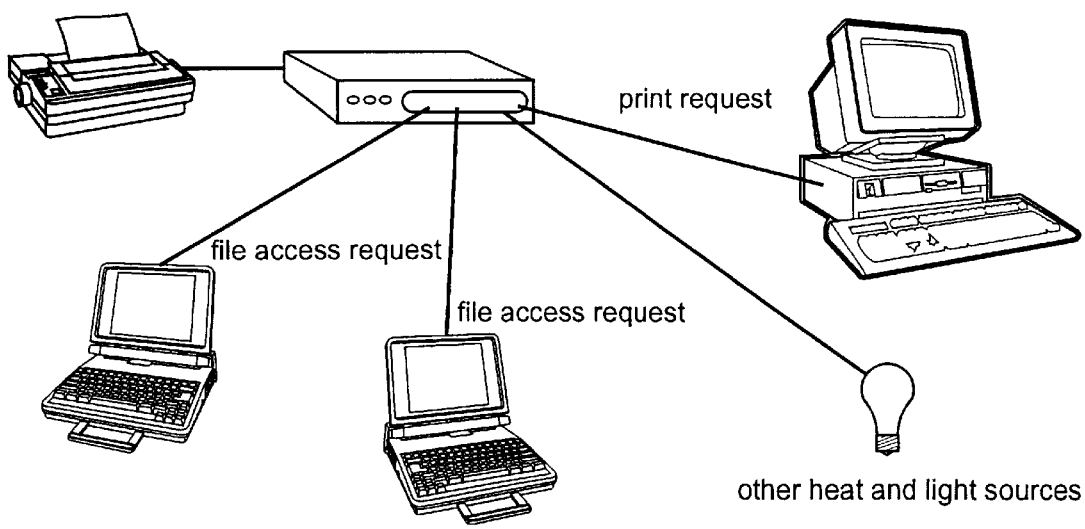
FIG. 25 is a schematic illustration of a network hub in an office equipment environment having signal separation capable for diffused light base communications which can simultaneously receive, separate and process communication signals from components of a wireless network.
Figure 26:
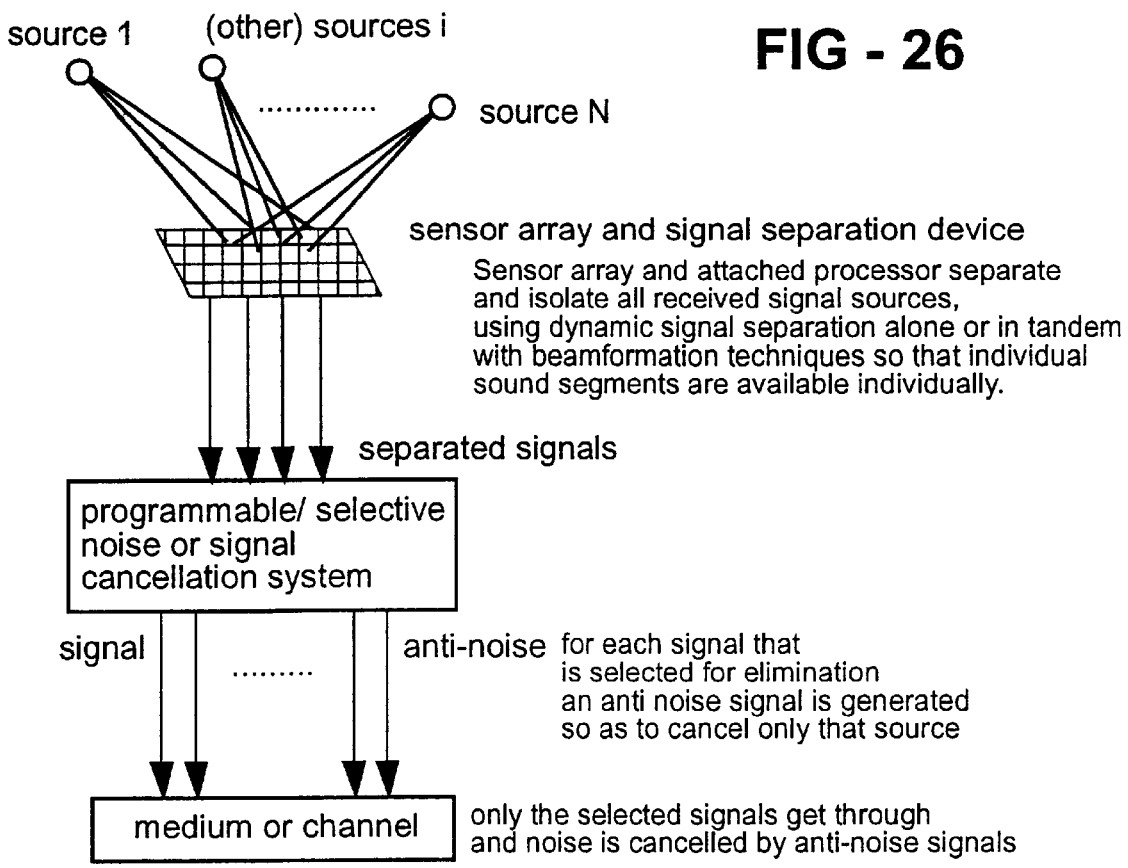
FIG. 26 is a schematic illustration of a sensor array equipped with signal separation apparatus for isolation of signal sources such as sounds originating from individual objects for programmable and selective noise or signal cancellation systems.
Figure 27:
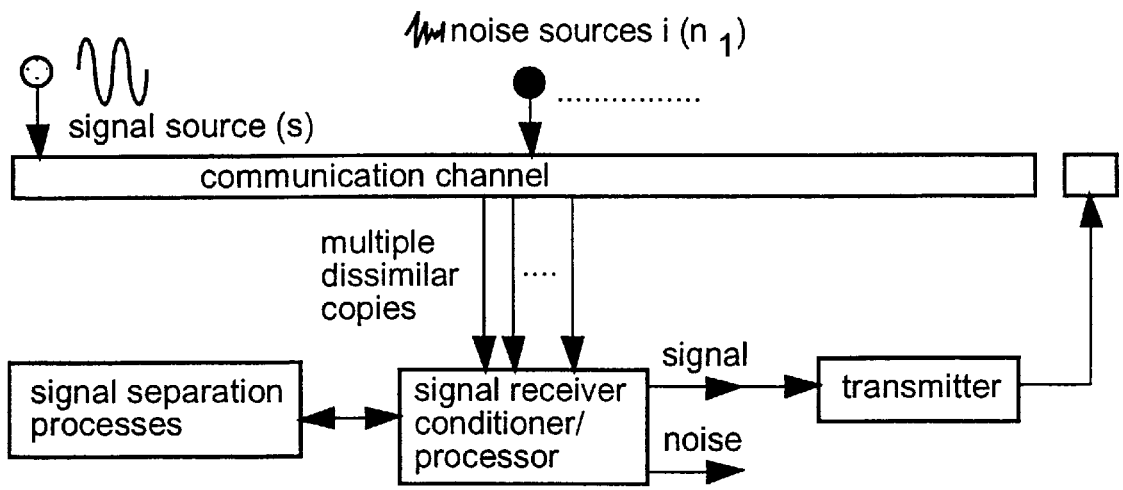
FIG. 27 is a block diagram showing a sensor array equipped with signal separation apparatus for isolation of signal from noise sources wherein the apparatus functions as a signal repeater.
Figure 28:
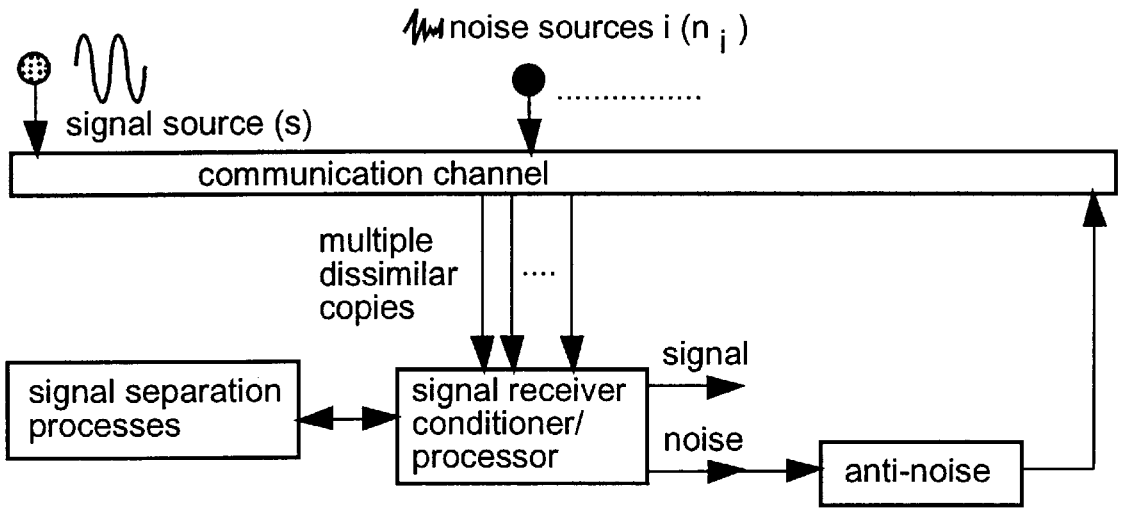
FIG. 28 is a sensor array similar to FIG. 27 wherein the structure functions as a noise canceller.
Figure 29:
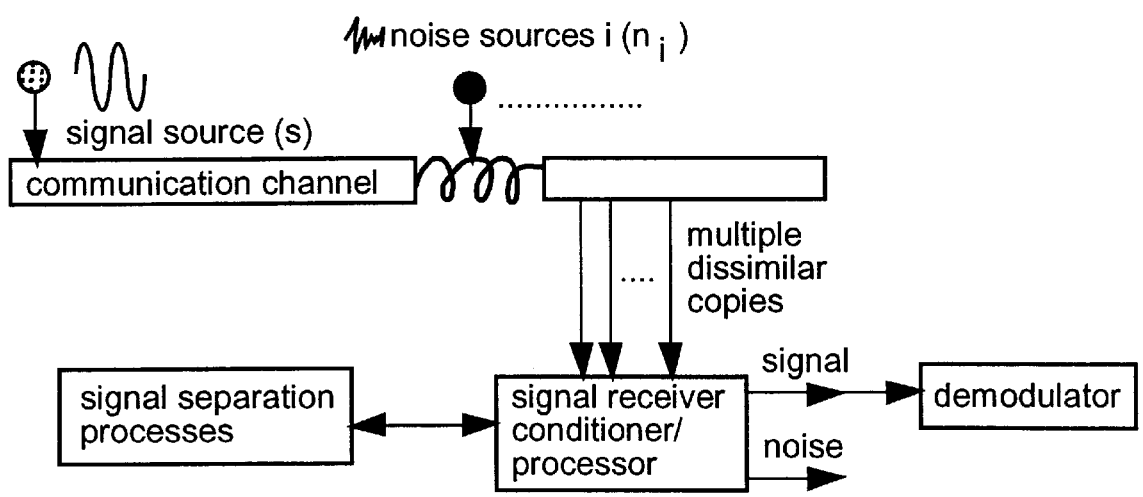
FIG. 29 is a sensor array similar to FIG. 27 wherein the structure functions as a smart receiver.

The channel sharing concept creates the opportunity to expand usage of fast multiple diffused light communication devices. In general, interference is not an issue with light based communications that require a clear line of sight between transmitter and receiver, as long as the angles that multiple links make with one another are greater than the original angle of the receiver. Using diffused light one does not have to meet as stringent requirements as directed light such as a clear line of sight, however, in this kind of an environment, it will be important that the multiple diffuse light signals received by a device, such as a network hub are interpreted correctly. Multipath distortion, co-channel interference, and environmental light and heat sources are the issues that need to be resolved. The dynamic signal separation algorithm can be used towards separating signals from their own multipath components, as well as for canceling environmental noise and separating channels from one another. An illustration of this concept using a network hub is shown in FIG. 25.

ADAPTIVE INTERFERER REJECTION

In the existing art, one observes that beamforming or its adaptive counterpart is used for interferer rejection. A beamformer is a processor used in conjunction with an array of sensors to provide a form of spatial filtering. The objective of an adaptive beamformer (ABF) is to perform spatial filtering to separate signals that have overlapping frequency content but originate from different spatial locations. In a noisy wireless environment, an ABF adapts the main beam of an antenna array towards the direction of a target source and places nulls of the array pattern in the direction of interferers and other users. This enhances the received signal-to-noise ratio to achieve high bit-rate wireless communication.

There are two shortfalls associated with beamforming: First, one must either have a prior knowledge of the location of the signal source or use adaptive schemes to locate it. This is not always possible and can prove especially difficult if the signal sources are in constant motion or have intersecting trajectories. The second shortfall of beamforming is that the simple algorithms assume narrowband signals. Broadband signals require additional filters and procedures and render real time implementation impossible using existing technology.

Successful application of this invention to adaptive interferer rejection would eliminate both of these shortfalls. First since localization of the signal source is not a requirement for separation of the signals, the signal sources are allowed move and have intersecting trajectories. Second, the frequency of the signals do not have the kind of direct relationship they do in the case of adaptive beam forming, therefore broadband, as well as narrowband signals are accommodated. The implementation bears a resemblance to the first application we described, namely nonmultiplexed medium or channel sharing. In the case of adaptive interferer rejection, however, the signal or signals that are of no interest are discarded. Referring to FIGS. 21 or 22, one would select one or more of the approximations of the signals of interest. Note that one also could use the characteristics of the discarded signal(s) to aid the interferer rejection process.

Adaptive interferer rejection is a technique that can be applied to multiple application domains, such as eliminating crosstalk between two or more cordless phones. Some additional uses are also listed below:

Cellular Communications

Cellular technology has become effective through the use of smaller areas of coverage and lower powered output devices. The basic cellular pattern is to use channels of radio frequency in clusters (called cells). Since the cells are small and the output is limited the frequencies can be used again and again. This allows far better management of the limited radio frequency spectrum. The intent is that separate cell clusters create minimum interference since the frequency reuse must be at least two cells away. The patterned are grouped and normally use 4, 7, 12 or 21 cells to allow for adequate coverage and prevent crosstalk and interference. In densely populated urban settings the cells have to be packed more densely and consequently cover smaller areas to accommodate multiple users. The urban landscape creates more transmission obstacles and multipath signals, which makes it yet harder to carry out reliable cellular communications. The result is undesirable crosstalk and interference between cells. The dynamic signal separation algorithm of this invention can equip each the cell tower receiver and/or each mobile receiver with the ability to distinguish and adaptively reject multipath signals, crosstalk and interference of signals that occupy overlapping spectra.

This would be accomplished by receiving multiple versions of the mixture using multiple directional antennas or receiver arrays. These mixtures can then be processed by the dynamic signal separation processor. The output signals can be examined and the correct signal or set of signals can be kept and further processed as needed.

Radar/Sonar Signal Isolation or Discrimination

Both radar and sonar are active sensing modalities. Signals sent out are reflected by objects of interest, such as ships, missiles, airplanes, and so on as well as from objects of no interest such as road traffic, rocks and trees, and weather factors often collectively referred to as clutter. The additional sources of interfering signals are noise, electronic countermeasures (or intentional jamming), electromagnetic interference (not intentional), and spillover. In such a crowded signal environment, the ability to separately detect multiple objects or multiple features on the same object is of great importance to radar and sonar signal processing. Arrays of sonar and radar sensors can to supply multiple dissimilar mixtures of the sensed signals. These in turn can be processed by the dynamic signal separation algorithm of this invention to distinguish (i) objects from clutter, (ii) one object from another, and (iii) multiple features of a single object from one another.

Source Localization and Following

Localization of signal sources in general is carried out in existing art by experimental measurement of phase delays between several sensors. This in fact forms the basis of beamformation algorithms. From these data one can either identify the direction of the source and/or triangulate the coordinates of the source. The delay between two sensors can be found by computing the cross-correlation function between the two sensor signals and then determining the location of its peak.

The signal separation method and apparatus of this invention could be used in collaboration with beamformation algorithms. Signal separation algorithms could be used to guide the beamformation process or vice versa. These two methods form a complementary pair since they have different data requirements and approach the problem differently. For instance, a far more accurate localization can be obtained by simultaneous execution of beamformation and signal separation, followed by comparison of the localized signals or their appropriate characteristics. Feedback from this comparison could be used to steer the beam and to update the adapting parameters of the dynamic signal separation network. Both examples of adaptive interferer rejection described so far, namely cellular communications as well as radar/sonar signal isolation can benefit from cooperative use of the complementary techniques of signal separation and beamformation.

Two additional examples are described below for (i) speech source localization and following, and (ii) tissue localization to guide the actions of medical personnel or automated medical equipment.

Example I

Sound Localization and Following

For sound localization, an arbitrary microphone can be selected and the delays of several other microphones (usually in a one or two dimensional array configuration) can be determined relative to this reference. Prior to computing the cross-correlations the signals should be windowed. An appropriate interval must be selected for this process. Theoretically as few as three microphones and thus two delays would be sufficient to exactly determine a talker's position in the above mentioned half plane. If a larger number of sensor data are available the redundant information can be used to eliminate the effects of noise by using all independent pairs of delays for localization on the same sound data. The median value of the resulting series of localizations could be used as the final value. Such an algorithm should be repeated several times a second, which allows the tracking of a speaker moving in a natural way.

The signal separation apparatus of this invention could be used in collaboration with beamformation algorithms towards speech source localization. Signal separation algorithms could be used alone or in tandem with beamformation algorithms, where signal separation guides the beamformation process or vice versa. These two methods form a complementary pair since they have different data requirements and approach the problem differently. For instance, a far more accurate localization can be obtained by simultaneous execution of beamformation and signal separation, followed by comparison of the localized signals or their appropriate characteristics. Feedback from this comparison could be used to steer the beam and to update the adapting parameters of the dynamic signal separation network.

Localization and following could be coordinated with other sensors. For instance, a person or persons could be followed around in a room, both acoustically and visually. A camera mount with pan/tilt controls coupled with a sound localization system could be used towards this end. Potential applications exist in teleconferencing, broadcasting, distance learning, site monitoring, security and surveillance. One could use the information delivered to postulate who is speaking to whom and where. This information could also be utilized to aid expert decision making processes downstream.

Example II

Signal Localization and Following for Medical Applications

Each tissue, organ, or anomaly displays different characteristics that modify the reflectance and absorbence characteristics of active sensing modalities used by medical diagnostic equipment. For example, ultrasound uses high frequency pressure waves to generate images within body tissue. The pressure waves are generated by a pressure transducer which converts electrical signals into a physical deformation. As the pressure waves move through a constant medium, there is no reflection. When there is a change in the medium density, however, a reflection occurs. This reflection returns to the pressure transducer where it is converted back into an electrical signal which can be processed into a 2-D slice image of a 3-D object. Noise is inherent in the system due to the large bandwidth of the input signal. As the signal crosses multiple boundaries it is reflected by different amounts and thus a mixing is perceived at the transducer. Signal separation method and apparatus of this invention could be used to separate these mixtures from one another and eliminate noise for a clearer and higher quality imaging of the tissues. In addition signal separation methods can be augmented with beamformation algorithms so that they may work in the real-time applications to localize relevant tissue and organ clusters aid during a medical diagnosis or treatment procedure. For instance, directed treatments that eliminate gall bladder stones without surgery must accurately locate them. Radiation treatment must be directed only towards cancer tissue and not harm adjacent organs. A medical probe inserted into the body should be aimed towards its desired destination traveling along unobstructed paths without agitating or piercing surrounding tissue.

For systems that require strict immobilization of the patient—such as insertion of a needle into the epidural area for delivery of anesthetics, or into the amniotic sack inside the uterus for fluid extraction and testing, on-line tissue localization gains special importance. Appropriate combinations of the signal separation and the beamformation techniques can be used to continuously locate the tissue that is being targeted, such as the epidural area or tissue that must be avoided, such as the fetus that is in motion in utero. Through cooperative use of signal separation and beamformation, the attending medical specialist or the automated medical equipment would have instantaneous accurate information about the coordinates of relevant tissues, organs, or to conduct the procedure correctly.

Example III

Signal Localization and Following for Post-disaster Recovery

After a natural or manmade disaster, it is critical to locate and rescue the survivors. For example after an earthquake or cave-in in a subway, it is of utmost importance to locate the people trapped under rubble or in a tunnel segment as quickly as possible. Knowing where to dig might make the difference between life and death for the victims. Under these circumstances, the signal separation and recovery method and apparatus of this invention could be used to process either passively or actively received signals from the disaster site. During this process, the signals emanating or reflected from survivors can be separated from other signals and noise. These separated signals, which often will be rather weak, can still be used to determine the presence and the approximate location of survivors. Additional methods such as beamforming or other physical mechanisms that translate or rotate the sensor array can be used to locate the signal sources, especially in the presence of many reverberating or multipath signals.

Smart Antenna or Receiver

Future antenna technology for wireless systems is very likely to involve smart and adaptive antenna arrays. Standard antennas will eventually be replaced by smart antennas using fixed beams, or adaptive antennas for base stations, as well as antenna technologies for handsets. In general the smartness of the antenna originates from the signal processing algorithms and arrangement of individual sensors. Expected improvements that these antennas can provide include range extension, multipath diversity, interference suppression, and capacity increase.

Signal separation techniques of this invention can be used alone or in cooperation with beamformation algorithms to augment the capabilities of smart antennas. Once again the signal separation process can be used to aid the beamformation algorithm or vice versa towards localization and interference suppression of the signal source. Especially for broadband communications where beamformation alone may be insufficient, this would provide a significant improvement over existing smart antenna technologies in the art.

SIGNAL SEPARATION AND DISCRIMINATION

Signal separation and discrimination are techniques that can be applied to multiple application domains some of which are listed below:

Speech and Voice Monitoring and Recognition Systems

Given the computational challenges associated with language, voice and speech recognition, it is desirable to supply to such systems only clear signals, that is, speech segments that are uncorrupted by noise, environmental sounds, and other speakers. The dynamic signal separation algorithm of this invention can be used as a front end towards this end. Microphone arrays can be used to obtain multiple versions of speech (and other) signals. These can be the mixture signals used to separate the signals to obtain the original individual signals or speech segments. These segments will contain far less amounts of noise and other sources of interference than the original signals picked up by the microphones.

Mechanical Diagnostics

Due to their increasing complexity, it is becoming less practical to diagnose mechanical systems using conventional means. For instance, many systems are too small to be dismantled by a human mechanic. Some components or surfaces mat be hidden from view or access, or other requirements may prohibit dismantling or human contact. Some operate in hazardous environments or have to be diagnosed on line, while in operation. It is therefore of interest to use automated noninvasive or noncontact diagnostic techniques in many settings, such as but not limited to, food and chemical processing, waste handling and disposal, oil and natural gas plants.

Two examples are presented for application of the signal separation and recovery method and apparatus to the mechanical diagnostics field:

Example I

Diagnosis of Mechanical Sounds

Identifying the sounds that different parts of a mechanical system make followed by an assessment of their characteristics for conformance to an accepted norm is a possible method. Many experienced human mechanics use this method as a rough indicator of the class of potential problems.

Dynamic signal separation of this invention can be used to distinguish sounds made by different components of a mechanical system, e.g., the sound of a loose bearing from a vibrating belt on a noisy engine, when it is integrated on machine diagnostic equipment. These sounds can in turn be analyzed—on or off line—by a human or automatic mechanic to identify the part or parts in need of maintenance.

Example II

Material, Surface and Layer Inspection

Radar, laser, xray, ultrasound or other means may be used to obtain body surface response from an item or object of interest, such as webs of materials, sheet metals, pipes, underground or overhead cables casings, poles, weight bearing structures, beams, tunnel enclosures, bridges, buildings, aircraft, navy vessels. This can be done while the object is in operation, e.g., while the building is occupied, or while the aircraft is in flight. Each surface, layer of these objects is often associated with a certain signal signature that distinguishes it from others. The dynamic mixing of the signals specific to certain materials, parts, surfaces and layers, however, often prohibit their reliable identification and inspection.

This problem would be eliminated through the cooperative use of a suitable sensor array and the signal separation and recovery apparatus of this invention. The signatures of individual components, layers and surfaces could be separated from other signals and noise. These could be inspected and matched with the acceptable signals for determination of the presence of defects, rust, holes, tears, and other anomalies. It could also be used to check the total integrity of the material, e.g., identify metal fatigue.

Supplementary methods such as beamforming or other physical mechanisms that translate or rotate the sensor array can be used to locate the signal sources, especially in the presence of many reverberating or multipath signals.

Medical Imaging, Instrumentation, and Diagnostic Equipment

Much the same way as an artificial mechanical system, living systems need to be inspected, examined and diagnosed for potential sources of disease and ailments. Medical diagnostic equipment usually accomplishes this task with minimal invasion of living tissue. Many diagnostic means are available to the contemporary physician and clinical personnel. From the common stethoscope to the most sophisticated Magnetic Resonance Imaging (MRI) equipment, these instruments transduce the physical attributes and constitution of human or animal tissue for the purposes of documentation, test, experimentation, identification, and diagnosis.

Signal separation has much needed potential uses in this area because especially in living tissue, multiple sources of activity are at work and their multiple responses get mixed in a complex manner during their transmittal through surrounding tissue, making a clear assessment of their characteristic difficult. For instance, a stethoscope placed on the back of a patient can detect the sounds of the heart, lungs, as well as the muffled sounds in the abdominal cavity coming through the diaphragm. A sophisticated computerized stethoscope equipped with multiple microphones and signal separation algorithm of this invention can be used to separate the sound of the heart from the lungs, the different sounds made by separate compartments of the heart from one another, as well as to distinguish a mother's heartbeat from a baby's. This simple example illustrates that the use of a single existing common medical equipment and its diagnostic mechanism can be both improved and extended using the signal separation algorithm. This principle can be expanded to include many other types of medical diagnostic tests, aids, and imaging procedures, which utilize active and/or passive sensing modalities, such as but not limited to electrocardiograms, electroencephalograms, ultrasound, computerized tomography (CT) scanners, and MRI imaging.

For example, ultrasound uses high frequency pressure waves to generate images within body tissue. The pressure waves are generated by a pressure transducer which converts electrical signals into a physical deformation. As the pressure waves move through a constant medium, there is no reflection. When there is a change in the medium density, however, a reflection occurs. This reflection returns to the pressure transducer where it is converted back into an electrical signal which can be processed into a 2-D slice image of a 3-D object. Noise is inherent in the system due to the large bandwidth of the input signal. As the signal crosses multiple boundaries it is reflected by different amounts and thus a mixing is perceived at the transducer. Signal separation method and apparatus of this invention could be used to separate these mixtures from one another and eliminate noise for a clearer and higher quality imaging of the tissues. Retrofitting with a signal separation processor may be a viable method of extending the use and life of existing equipment in the field. These signal processing techniques may be modified to work in the real-time applications.

Signal Separation for Data Compression

Signal compression is desirable so that maximum use of storage and communication systems can be made. For instance, a compression ratio of 8:1 for video images would imply that eight times as many image frames could be stored or transmitted as it would be possible without compression.

Signal separation can be a means of carrying out signal compression in a directed manner. Outputs of the process are separated signals that correspond to individual objects or features of interest that are separated from noise or background signals, as well as from one another. Signal compression via separation can also be conducted in an interactive way. For instance, the person receiving a signal that has been compressed by signal separation can switch between multiple channels of independent signals with each signal providing information about a different aspect of the remote site that is being sensed. This may also be a natural way of partitioning the data for recording or later analysis. The figure below illustrates this concept with a remote sensing application example.

Quality and Security Inspection

There are many occasions which make it necessary to inspect various objects for detection and location of defects and other anomalies. Two specific examples can be cited: (1) A quality inspection of the product or the production equipment during or at the end of a particular manufacturing process, and (2) a security check point that scans people or baggage contents for weapons or explosives. These types of stations are usually equipped with sensors that actively or passively record and study signals emanating from the object(s) under scrutiny. The transduced signals are often mixtures of the different signals originating from various locations or subcomponents of the object that is being inspected, as well as echoes, multipath signals, noise, and other environmental factors. Signal separation alone or in cooperation with other complementary techniques, such as adaptive beamformation, can be used to separate the signals received by the sensor elements performing the inspection, to isolate features or objects of interest. This would make the detection, identification and classification of defects or other anomalies more convenient, whether these operations are being performed by automated systems or humans.

ACTIVE NOISE CANCELLATION BY SIGNAL SEPARATION

Active noise cancellation technology involves the manipulation of sound and signal waves to reduce noise, improve signal-to-noise ratios and enhance sound quality. Simple filtering or other passive methods do not work in many situations because they do not cancel the noise from the background or indiscriminately eliminate crucial components of signals of interest along with noise.

Existing active techniques in the art cancel noise by electronic coupling of a low frequency noise wave with its mirror image, called "anti-noise". This noise is generated by a noise model that is formulated from the observed characteristics of a specific type of noise. Based on this principle, a series of algorithms can be specifically designed to remove background noise from speech and other transmitted signals.

Cancellation of Environmental Noise

Signal separation methods and devices based on this invention could provide a far more accurate anti-noise signal. The noise that is separated from the multiple dissimilar copies of signal with added noise will be far more accurate than a noise signal that is generated from an adaptive noise model simply because the noise separated from the mixture of signals is indeed the true noise signal at that point in time.

This type of improved active noise cancellation technology can be applied to headsets, communications, microphones, other multimedia audio systems and noise sources themselves, such as industrial and vehicular mufflers, ground or air based vehicle cabin quieting, air duct quieting, as well as adaptive quieting of sounds from fans, air conditioners, power transformers, etc.

Distance Extension of a Communication Signal's Effective Reach

Noise cancellation may be preferable to signal amplification at regular intervals since simple amplifiers boost noise as well as the signal. Signal separation methods combined with programmable signal elimination can distinguish signal from noise and transmit the signal only, or release an anti noise signal that will null out the noise component of the composite signal(s).

It may also be possible to eliminate the need for signal repeaters altogether or significantly increase the required distance between repeaters using signal separation based noise cancellation or suppression. For example, currently for ISDN phone lines, repeaters must be installed by the phone company to assure transmission over distances greater than 18,000 feet. The repeater adds additional cost to both the installation and the monthly service charge. By using the signal separation algorithm at the receiving end, it would be possible to distinguish the weaker ISDN signal from transmission noise without the need for installing repeaters every 18,000 feet.

Increasing Maximum Possible Communication Speed by Reducing Error Rates

When communication is carried out through variable speed links or channels, it is usually the error rate that determines the negotiated rate of information transfer between transmitter and receiver. The signal separation based noise cancellation or suppression applications would be a possible way of significantly reducing errors by eliminating the bulk of noise or interference from the channel. An example scenario was demonstrated in FIG. 24 for interfering digital communication signals modulated using binary phase shift keying (BPSK).

It is appreciated that various modifications to the inventive concepts may be apparent to those skilled in the art without departing from the spirit and scope of the invention.

What is claimed is:

1. A signal processing system for separating signals received from plural sources via an unknown channel or medium, comprising a plurality of detectors each for detecting said mixed signals received from said plural sources and a processor for receiving the detected signals and processing them in accordance with the following compact general dynamic feedback vector equation:

$$TY'=-AY-DY+BE$$

where

T is a r×r diagonal matrix,

A is a nonsingular positive definitive matrix of size r×r and may be used as the identity matrix, Y is a vector of size r comprised of the outputs that are expected to approximate the original unmixed sources, Y' is a vector of size r, where "'" denotes the rate of change derivative with respect to a parameter t, Y' is dY/dt, D is the unmixing matrix of size r×r, B is a matrix of size r×m, and when r=m, B is the identity matrix, E is a vector of size m comprised at the detected mixed received signals, and where the entries of the unmixing matrix D, $d_{ij}$, are updated according to the update equation:

$$d'_{ij}=\eta_{ij}f_i(y_i)g_j(y_j)$$

where $\eta_{ij}$ is a small constant or decaying function, $f_i()$ and $g_j()$ are odd functions, $y_i$ and $y_j$ are elements of the vector Y comprised of the outputs that are expected to approximate the original unmixed sources, and "'" denotes the rate of change derivative with respect to the same parameter t.

2. A signal processing system according to claim 1, where entries of T and the values of $\eta_{ij}$ are sufficiently small or decaying, and Y and D are initialized by arbitrary values, and some entries of D are assigned to constant values and the update equation in claim 1 applies only to the entries of D which are not constant.

3. A signal processing system according to claims 1 or 2, wherein the number of signal sources that are detected by the detectors is equal to a nonnegative integer value N and the value of N is known, and the number of detector outputs is equal to the number m, and m is known, and N=m, in which case Y and E defined in claim 1 have the same dimension, D is a square matrix and the equations defined in claim 1 can be used directly without alteration.

4. A signal processing system according to claims 1 or 2, wherein the number of signal sources that are detected by the detectors is equal to a nonnegative integer value N and the value of N is known, and the number of detector outputs is equal to the number m, and m is known, and N≦m, in which case the equations defined in claim 1 can be used directly without alteration, but the vector Y, which is of size m (r=m) and whose entries approximate the original sources will have some zero entries.

5. A signal processing system according to claims 1 or 2, wherein the number of signal sources that are detected by the detectors is equal to a nonnegative integer value N and the value of N is known, and the number of detector outputs is equal to the number m, and m is known, and N≦m, in which case the equations defined in claim 1 can be used directly without alteration, and where the matrix B has less rows than columns, and where the vector Y is of size N (r=N) and the vector BY is of size N.

6. A signal processing system according to claims 1 or 2, wherein the number of signal sources that are detected by the detectors is equal to a nonnegative integer value N and the value of N is known, and the number of detector outputs is equal to the number m, and m is known, and N≦m, in which case the equations defined in claim 1 can be used directly without alteration, and where the matrix B has less rows than columns, and where the vector Y is of size q (r=q) and the vector BY is of size q, such that N<q<m.

7. A signal processing system according to claims 1 or 2, wherein the number of signal sources that are detected by the detectors is equal to a nonnegative integer value N and the value of N is known, and the number of detector outputs is equal to the number m, and m is known, and N≧m, in which case the equations defined in claim 1 are applied after preprocessing of detected mixed signals to eliminate or filter out a number of signal sources by other known methods in such a way that the remaining signal sources in the mixtures are less than or equal to the number of detectors.

8. A signal processing system according to claims 1 or 2, wherein the number of signal sources that are detected by the detectors is equal to a nonnegative integer value N and the value of N is known, and the number of detector outputs is equal to the number m, and m is known, and N≧m, in which case the equations defined in claim 1 are applied nonetheless, after which a post processing step removes the signal sources that contaminate the output channels by other known methods.

9. A signal processing system according to claims 1 or 2, wherein the number of signal sources that are detected by the detectors is equal to a nonnegative integer value N and the value of N is known, and the number of detector outputs is equal to the number m, and m is known, and N≧m, in which case the equations defined in claim 1 are applied nonetheless, but where the initialization values of D and Y can be manipulated in such a manner to direct one or more of the relevant or desired signals into separate channels while the rest of the "undesired" or irrelevant signals are directed to unused or discarded separation outputs.

10. A signal processing system according to claims 1 or 2, wherein the number of signal sources that are detected by the detectors is equal to m, and m is unknown, in which case their number is initially assumed to be equal to that of the number of detectors, which is equal to N, and based on the characteristics and contents of the output.

11. A signal processing system as defined in claim 1 wherein the physical computing mechanism is an architecture of analog or digital or mixed analog digital circuits, or other physical means that compute a set of elementary or complex functions arranged specifically for obtaining the solution of the differential equations in claim 1.

12. A signal processing system as defined in claim 1 wherein the physical computing mechanism is any general computer architecture which can be programmed with the necessary set of operations needed for obtaining the solution of the differential equations in claim 1.

13. A signal processing system as defined in claim 1 wherein the physical computing mechanism is an architecture specifically designed for real time on line instantaneous signal processing containing circuit elements that convert analog detector output to digital format, a digital signal processor programmed to obtain the solution of the differential equations in claim 1, and circuit elements for storage of data or programs necessary or desirable for such computation and elements that convert the digital output from the digital signal processor output back to analog form.

14. A channel sharing method where (1) a number of channels need to be shared among multiple transmitter sources, which may operate independently of one another, and (2) the number of said channels is less than the number of transmitter sources, and (3) the multiple transmitter sources each transmit messages using any set of modulation techniques, which may vary among transmitters, and some of which may be unknown, and (4) the said multiple transmitter sources transmit messages in a channel simultaneously by way of modulating the messages onto several asynchronous carriers, thus generating transmitter signals that may have overlapping spectra, and (5) such transmitted signals are mixed with one another in the channel subject to the physical properties of the channel so that the resulting composite signal in the channel may consist of the superposition of the transmitter signals, and (6) at the receiver end, a receiver, which uses multiple antennae or mimics the use of multiple antennae, detects or constructs simultaneous multiple copies of the superimposed transmitter signals with at least one received or reconstructed copy being different from the other copies and (7) the said multiple copies are processed to obtain the original transmitted signals by a signal separation method or apparatus that separates the superimposed signals at least partially into their unmixed components and estimates at least one of the original transmitter signals or messages.

15. A channel sharing method as in claim 14 where the transmitter signals are mixed not deliberately but unintentionally and the method of claim 14 is used for purposes of interferer rejection or cancellation.

16. A channel sharing method as in claim 14 used in conjunction with another channel sharing method for purposes of recovering at least one transmitted signal, or distinguishing one transmitted signal from another, or interferer rejection or noise cancellation.

17. A channel sharing method as in claim 14 used in conjunction with various signal localization or spatial filtering techniques.

18. A channel sharing method where (1) a number of channels need to be shared among multiple transmitter sources, and (2) the number of said channels are less than the number of transmitter sources, and (3) the multiple transmitter sources transmit messages using one or more types of modulation techniques independent of one another in a narrowband or broadband channel simultaneously by way of modulating the signals onto several asynchronous carriers, which, prior to or after modulation, may have overlapping spectra, and (4) such transmitted signals are mixed with another in the channel so that the resulting composite signal in the channel may consist of the superposition of the modulated signals comprising the steps of receiving the transmitted signals, detecting multiple dissimilar copies of the superimposed transmission signals and processing by signal separation the dissimilar copies of the superimposed transmission signals to obtain the original transmitted signals in accord with the following equations:

$$TY'=-AY-DY+BE$$

where

T is a r×r diagonal matrix,

A is a nonsingular positive definitive matrix of size r×r and may be used as the identity matrix, Y is a vector of size r comprised of the outputs that are expected to approximate the original unmixed sources, Y' is a vector of size r, where "'" denotes the rate of change derivative with respect to a parameter t, Y' is dY/dt, D is the unmixing matrix of size r×r, B is a matrix of size r×m
and when r=m, B is the identity matrix, E is a vector of size m comprised at the detected mixed received signals, and where the entries of the unmixing matrix D, $d_{ij}$, are updated according to the update equation:

$$d'_{ij}=\eta_{ij}f_i(y_i)g_j(y_j)$$

where $\eta_{ij}$ is a small constant or decaying function, $f_i()$ and $g_j()$ are odd functions, $y_i$ and $y_j$ are elements of the vector Y comprised of the outputs that are expected to approximate the original unmixed sources, and "'" denotes the rate of change derivative with respect to the same parameter t.

19. A channel sharing method as in claim 18 where the transmitter signals are mixed not deliberately but unintentionally and the method is used for purposes of interferer rejection or cancellation.

20. A channel sharing method as in claim 18 where the transmitter signals are mixed deliberately as in the case of code division multiple access techniques, and the method in claim 18 is used for purposes of interferer rejection or noise cancellation.

21. A method as described in claim 14 where the transmitter signals are mixed deliberately or unintentionally and where the transmitter signals have been generated by using codes which are not orthogonal, or where transmitter signals have been generated with codes unknown or not unique to a single transmitter, and the method in claim 14 is used for purposes of distinguishing one transmitted signal from another, or interferer rejection, or noise cancellation.

22. A channel sharing method where (1) a single frequency band is to be shared among two transmitters, and (2) there is only a single frequency band available to allocate between the two transmitters, and (3) the two transmitter sources transmitting messages use channel sharing or modulation techniques, selectively using or not using any individual code or set of unique codes that would render the modulated signal distinguishable from other modulated signals that use different and distinguishable code, and (4) the two transmitter sources transmitting messages in the same frequency band simultaneously by way of modulating the signals onto several asynchronous carriers, which may have overlapping spectra, and (5) the two transmitted signals mix with each another in the same frequency band so that the resulting composite signal in the band consists of a superposition of the modulated signals, and (6) at the receiver end, a composite receiver detects two dissimilar copies of the superimposed transmission signals, so that one copy is different from the other copies, and (7) the two copies are processed to obtain the two original transmitted signals by a signal separation method.

* * * * *

UNITED STATES PATENT AND TRADEMARK OFFICE
CERTIFICATE OF CORRECTION

PATENT NO. : 6,236,862 B1
DATED : May 22, 2001
INVENTOR(S) : Erten et al.

It is certified that error appears in the above-identified patent and that said Letters Patent is hereby corrected as shown below:

<u>Column 2,</u>
Line 41, delete "$S_N(t)$" and insert -- $s_N(t)$ --;

<u>Column 3,</u>
Line 11, delete "62" and insert -- $\delta_2$ --;

<u>Column 6,</u>
Line 16, delete "d*" and insert -- $\dot{d}^*$ --;

<u>Column 8,</u>
Lines 2-3, the sentence "Illustration of Results of the Dynamic Signal Separation Algorithm" is a section heading, and so should be centered and offset relative to the rest of the text;

<u>Column 12,</u>
Line 23, delete "t" and insert -- $\tau$ --;

<u>Column 19,</u>
Line 62, delete "absorbence" and insert -- absorbance --;

<u>Column 25,</u>
Lines 57 and 66, delete "N≦m" and insert -- N≤m --;

<u>Column 26,</u>
Line 7, delete "N≦m" and insert -- N≤m --;
Lines 17, 26, and 35, delete "N≧m" and insert -- N≥m --;

Signed and Sealed this

Twenty-ninth Day of January, 2002

Attest:

*Attesting Officer*

JAMES E. ROGAN
*Director of the United States Patent and Trademark Office*